United States Patent
Ozaki et al.

(10) Patent No.: US 9,082,306 B2
(45) Date of Patent: *Jul. 14, 2015

(54) IN-VEHICLE DISPLAY APPARATUS, DISPLAY METHOD, AND INFORMATION DISPLAY SYSTEM

(75) Inventors: Yukisuke Ozaki, Kobe (JP); Takayoshi Yamashita, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 283 days.

This patent is subject to a terminal disclaimer.

(21) Appl. No.: 13/116,715

(22) Filed: May 26, 2011

(65) Prior Publication Data

US 2011/0291863 A1 Dec. 1, 2011

(30) Foreign Application Priority Data

May 28, 2010 (JP) ................................. 2010-123592

(51) Int. Cl.
  *G08G 1/0967* (2006.01)
  *G01C 21/36* (2006.01)

(52) U.S. Cl.
  CPC ...... *G08G 1/096791* (2013.01); *G01C 21/3682* (2013.01); *G01C 21/3694* (2013.01)

(58) Field of Classification Search
  CPC ..... G08G 1/0967; G08G 1/096708–1/096791; G01C 21/26; G01C 21/36; G01C 21/3602–21/3694
  USPC ........................... 340/988–996; 701/400–541
  See application file for complete search history.

(56) References Cited

U.S. PATENT DOCUMENTS

| | | | |
|---|---|---|---|
| 2004/0172193 A1* | 9/2004 | Monde et al. | 701/209 |
| 2005/0221876 A1 | 10/2005 | Van Bosch et al. | |
| 2005/0273216 A1* | 12/2005 | Imai et al. | 701/1 |
| 2006/0142941 A1* | 6/2006 | Imai et al. | 701/211 |
| 2006/0199612 A1 | 9/2006 | Beyer, Jr. et al. | |
| 2007/0129880 A1* | 6/2007 | Thacher | 701/202 |
| 2007/0225902 A1 | 9/2007 | Gretton et al. | |
| 2007/0273555 A1* | 11/2007 | Amano | 340/935 |
| 2008/0109153 A1 | 5/2008 | Gueziec | |

(Continued)

FOREIGN PATENT DOCUMENTS

| | | |
|---|---|---|
| JP | A 2005-30886 | 2/2005 |
| JP | A-2005-157410 | 6/2005 |

(Continued)

OTHER PUBLICATIONS

Dec. 24, 2013 Notice of Rejection issued in Japanese Patent Application No. 2010-123592 (with partial translation).

*Primary Examiner* — Hai Phan
*Assistant Examiner* — Orlando Bousono
(74) *Attorney, Agent, or Firm* — Oliff PLC

(57) ABSTRACT

An in-vehicle display apparatus includes a communication device and an in-vehicle device. The communication device acquires information posted by the user and geographical location data indicating the destination of the posted information and classifies the acquired posted information into categories. The communication device generates map data in which the posted information is displayed in a display format corresponding to the classified category at a position on the map specified by the geographical location data that is acquired together with the posted information and transmits the map data to the in-vehicle device. The in-vehicle device displays the received map data on, for example, a liquid crystal monitor.

10 Claims, 17 Drawing Sheets

(56) References Cited

U.S. PATENT DOCUMENTS

| | | | |
|---|---|---|---|
| 2008/0189030 A1* | 8/2008 | Aoki | 701/201 |
| 2008/0284615 A1* | 11/2008 | Tauchi et al. | 340/905 |
| 2009/0030596 A1* | 1/2009 | Okude et al. | 701/117 |
| 2009/0292458 A1* | 11/2009 | Nakamura et al. | 701/200 |
| 2009/0309758 A1* | 12/2009 | Gueziec | 340/905 |
| 2010/0087984 A1* | 4/2010 | Joseph | 701/33 |
| 2010/0114484 A1* | 5/2010 | Kida et al. | 701/208 |
| 2010/0117810 A1* | 5/2010 | Hagiwara et al. | 340/425.5 |
| 2010/0121570 A1* | 5/2010 | Tokue et al. | 701/208 |
| 2010/0211868 A1* | 8/2010 | Karmarkar et al. | 715/234 |

FOREIGN PATENT DOCUMENTS

| | | |
|---|---|---|
| JP | A-2006-178228 | 7/2006 |
| JP | A-2007-3262 | 1/2007 |
| JP | A-2007-278807 | 10/2007 |
| JP | A-2009-19910 | 1/2009 |
| JP | A 2009-163366 | 7/2009 |
| JP | A 2009-204460 | 9/2009 |
| JP | A 2010-102616 | 5/2010 |

* cited by examiner

FIG.3

| TAG | CLASSIFIED CATEGORY | | DISPLAY FORMAT | |
|---|---|---|---|---|
| #Tra | TRAFFIC | Traffic | ICON (SPEECH BUBBLE) | RED |
| #Wea | WEATHER | Weather | ICON (SPEECH BUBBLE) | WHITE |
| #Sce | SCENE | Scene | ICON (SPEECH BUBBLE) | GREEN |
| #Cus | CUSTOM | Custom | ICON (SPEECH BUBBLE) | YELLOW |
| #Inf | INFORMATION | Information | ICON (SPEECH BUBBLE) | BLUE |

FIG.4

| POST DATA AND TIME | TAG | CONTENT | GEOGRAPHICAL LOCATION DATA | MOVING PICTURE | VOICE | CLASSIFICATION RESULT |
|---|---|---|---|---|---|---|
| 2010/4/26 10:00:00 | #Tra | TRAFFIC JAM | ○○ INTERSECTION, KOBE-SHI, HYOGO-KEN | 111.jpeg | - | TRAFFIC |
| 2010/4/26 10:00:02 | #Wet | VISIBILITY IS POOR BECAUSE OF DENSE FOG | ○○ 1-CHOME, KOBE-SHI, HYOGO-KEN | - | - | - |
| 2010/4/26 10:00:05 | #Sce | BEAUTIFUL SCENERY | ROKKOSAN×× | NIGHT VIEW.mpeg | PRESENT | SCENE |
| 2010/4/26 10:00:15 | #III | NOW, 100 YEN/L! | ○○ 3-CHOME, KOBE-SHI, HYOGO-KEN | - | - | - |
| ... | ... | ... | ... | ... | ... | ... |

FIG.5

| POST | FIXED PHRASE | TAG |
|---|---|---|
| TRAFFIC | TRAFFIC JAM | #Tra |
| | NOW | #Tra |
| | BYROAD | #Tra |
| | DANGER! | #Tra |
| | RECOMMENDED PLACE | #Tra |
| | PARKING OK | #Tra |
| WEATHER | RAIN | #Wea |
| | SNOW | #Wea |
| | FREEZING | #Wea |
| | DENSE FOG | #Wea |
| | RAINSTORM | #Wea |
| | TYPHOON | #Wea |
| SCENE | DELICIOUS | #Sce |
| | BEAUTIFUL SCENERY | #Sce |
| | GREAT SPOT | #Sce |
| CUSTOM | WHAT IS IT | #Cus |
| | FIREWORKS | #Cus |
| INFORMATION | GASOLINE | #Inf |
| | TRAFFIC JAM IS CLEARED | #Inf |

FIG.19

| NAME | ADDRESS | HOBBY | PREFERENTIAL DISPLAY INFORMATION |
|---|---|---|---|
| TOKKYO TARO | OO, CHIYODA-KU, TOKYO | SKI, DRIVE | TRAFFIC INFORMATION, WEATHER |

IN-VEHICLE DISPLAY APPARATUS, DISPLAY METHOD, AND INFORMATION DISPLAY SYSTEM

CROSS-REFERENCE TO RELATED APPLICATIONS

This application is based upon and claims the benefit of priority of the prior Japanese Patent Application No. 2010-123592, filed on May 28, 2010, the entire contents of which are incorporated herein by reference.

BACKGROUND OF THE INVENTION

1. Field of the Invention

The present invention relates to an in-vehicle display apparatus and a display method.

2. Description of the Related Art

In-vehicle devices, such as car navigation devices, have been proposed which display information that is obtained in real time by, for example, a Vehicle Information and Communication System (VICS) or a Radio Data System (RDS) using radio waves on a display. In addition, in-vehicle devices have been proposed which display real-time information that is acquired from the screen of the Internet by wireless communication using, for example, Bluetooth (registered trademark) or real-time information acquired by a distribution-type probe on a display.

In recent years, in-vehicle devices have been known which display, for example, a voice message or an icon in which geographical location data is associated with a short message on the map. For example, the user operates the touch panel of the in-vehicle device to post the geographical location data and a text message or uses a mobile phone to post a voice message. Then, the in-vehicle device receives the posts and displays the posted information, such as the received messages article, as an icon at the position on the map specified by the received geographical location data.

When the user selects the icon, the in-vehicle device displays the site of the posted message article or outputs the voice message attached to the selected icon. When there is a plurality of posts at the same position, the in-vehicle device changes, for example, the shapes or colors of the icons and displays the plurality of posts at the same time. When any one of the icons is selected, the in-vehicle device displays a list of posts in the vicinity of the selected position such that each post can be selected. In addition, the in-vehicle device may perform display limit such that only a specific item is displayed.

In recent years, open tools (services), such as Twitter (registered trademark), capable of sharing information in real time using information communication apparatuses, such as smart phones, mobile phones, and personal computers have come into widespread use. For example, the user starts Twitter (registered trademark), posts a short sentence including a predetermined number of characters, which is called a "tweet," refers to the response of other persons to the post, and communicates with other persons. In addition, an Application Program Interface (API) related to geographical location data is opened to the public and Twitter (registered trademark) can transmit information related to each region or position.

However, in the related art, such as Japanese Patent Application Laid-open No. 2007-278807, it is difficult for the user to know the content of the posted information displayed on the in-vehicle device at a glance. Therefore, there is a concern that the reading of the posted information or the posting of information will have an adverse effect on safe driving.

Specifically, since the in-vehicle device according to the related art displays all of the posted information, such as blog articles or tweets, acquired in real time on the screen, it is difficult for the user, such as the driver, to know the content of an enormous amount of posted information displayed on the in-vehicle device. Therefore, the driver take the eyes off the road during driving in order to operate the in-vehicle device to read the content of the posted information. As a result, it is difficult for the driver to concentrate on driving, which has an adverse effect on safe driving. In addition, the driver needs to directly operate the in-vehicle device to post information. In this case, it is difficult for the driver to concentrate on driving, which has an adverse effect on safe driving. Therefore, the structure in which the user perform a complicated operation is not preferable.

Meanwhile, it is considered that, after driving ends, the driver reads the posted information displayed on the in-vehicle device or posts information in order to ensure safe driving. However, in this case, when driving ends, the latest information is not obtained and real-time processing deteriorates. Therefore, it is difficult to transmit useful information in real time and effective use for example, blogs or Twitter (registered trademark).

SUMMARY OF THE INVENTION

It is an object of the present invention to at least partially solve the problems in the conventional technology.

According to An in-vehicle display apparatus that is provided in a vehicle and displays information posted by a user, includes a category classifying unit that classifies the posted information into categories; and a display unit that displays map data in which the posted information is displayed in a display format corresponding to the category classified by the category classifying unit at a position which is specified on the basis of geographical location data indicating the destination of the posted information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of information stored in a category DB;

FIG. 4 is a diagram illustrating an example of information stored in a posted information DB;

FIG. 5 is a diagram illustrating an example of information stored in a fixed phrase DB;

FIG. 19 is a diagram illustrating an example of profile information;

DETAILED DESCRIPTION OF THE PREFERRED EMBODIMENTS

Figure 1:
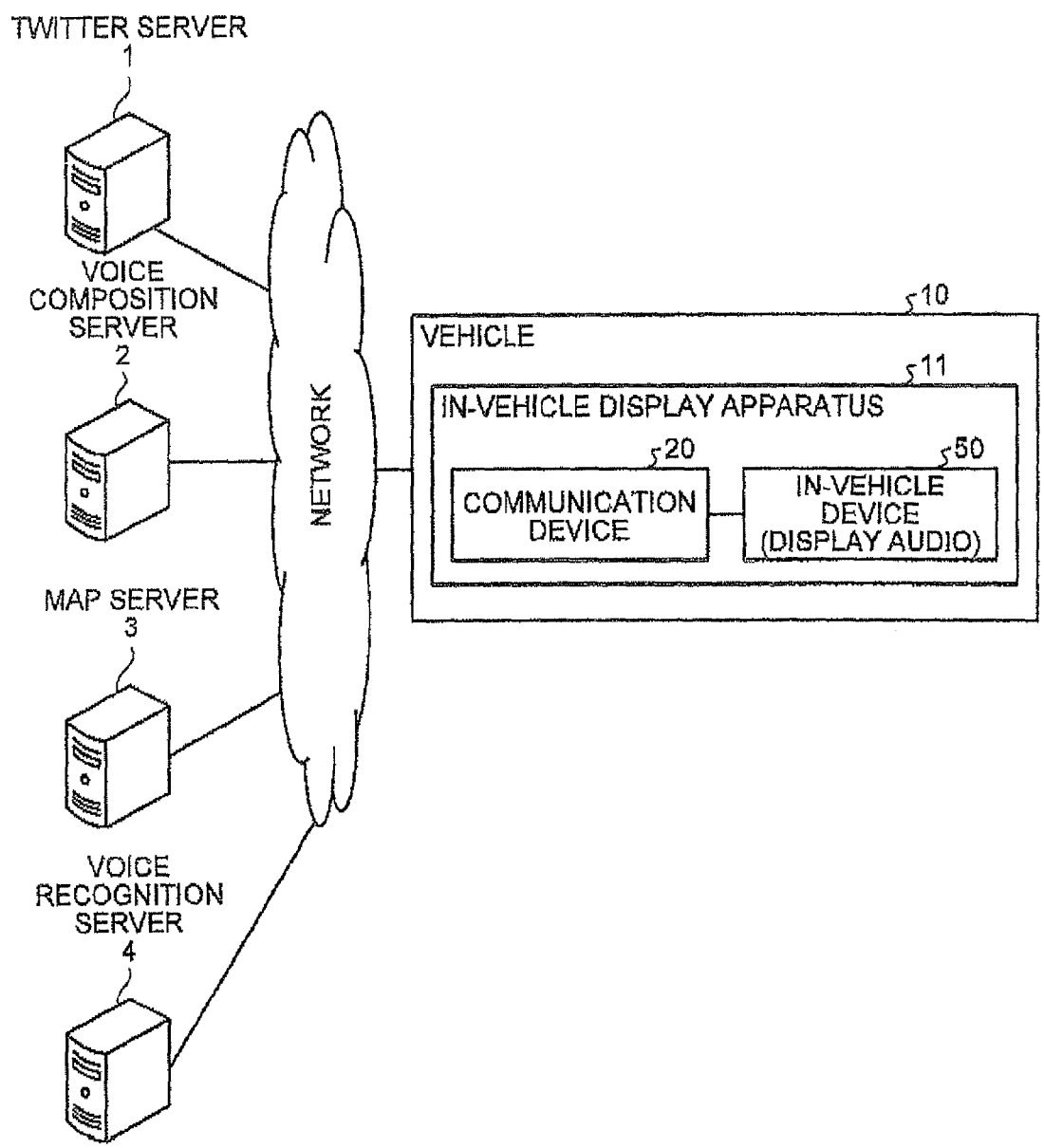
FIG. 1 is a diagram illustrating the overall structure of a system including an in-vehicle display apparatus according to a first embodiment.

FIG. 1 is a diagram illustrating the overall structure of a system including an in-vehicle display apparatus according to a first embodiment. As illustrated in FIG. 1, the system includes a Twitter server 1, a voice composition (text-to-speech) server 2, a map server 3, a voice recognition server 4, and an in-vehicle display apparatus 11 that is provided in a vehicle 10 such as a car. In this embodiment, Twitter (registered trademark) is used as posted information, but the invention is not limited thereto. For example, post services, such as a blog, a simple mail, and a Social Network Service (SNS), may be used as the posted information.

The Twitter server 1 is a posted information server that stores posted information, such as tweets that are posted by the individual users who are identified by their user IDs with, for example, their mobile phones. In addition, when voice data is added to the posted information, the Twitter server 1 stores the added voice data in the voice composition server 2. When map data added to the posted information, the Twitter server 1 stores the added map data in the map server 3.

When the user receives a request to acquire posted information, the Twitter server 1 transmits the stored posted information to the mobile phone of the user. For example, the Twitter server 1 transmits the posted information stored between the previous acquisition request and the current acquisition request. Various methods can be used to transmit the posted information. For example, the Twitter server 1 may transmit only the posted information of another user followed by the user, that is, the posted information of a user designated by the user, who is a request source, in the posted information stored between the previous acquisition request and the current acquisition request. In addition, the Twitter server 1 may transmit only the information posted from the current position of the user to a position in a predetermined range in the posted information stored between the previous acquisition request and the current acquisition request.

The voice composition server 2 composes the information posted to the Twitter server 1 with the voice data added to the information. For example, the voice composition server 2 receives an identifier for identifying the posted information and the voice data from the Twitter server 1 and stores them so as to be associated with each other. The voice composition server 2 receives a request to acquire the voice data added to the posted information acquired from the Twitter server 1 from the user. Then, the voice composition server 2 specifies voice data with, for example, the identifier included in the acquisition request and transmits the specified voice data to the user.

The map server 3 composes the information posted to the Twitter server 1 and the map data added to the information. For example, the map server 3 receives, for example, the identifier for identifying the posted information and the map data from the Twitter server 1 and stores them so as to be associated with each other. Then, the map server 3 receives a request to acquire the map data added to the posted information acquired from the Twitter server 1 from the user. Then, the map server 3 specifies map data with, for example, the identifier included in the acquisition request and transmits the specified map data to the user.

The voice recognition server 4 comprehends the voice of the user, converts the voice into text, and transmits the text to the Twitter server 1. The user can post information only by transmitting a voice to the voice recognition server 4, in addition to by generating information with, for example, a portable terminal and then posting the information. As such, since a voice is recognized and information is posted, the driver does not need to perform a complicated operation and safe driving is ensured.

In this embodiment, in FIG. 1, the Twitter server 1, the voice composition server 2, the map server 3, and the voice recognition server 4 are provided in different housings, but the invention is not limited thereto. For example, the Twitter server 1, the voice composition server 2, the map server 3, and the voice recognition server 4 may be provided in a housing.

The in-vehicle display apparatus 11 is provided in the vehicle 10 and includes a communication device 20 and an in-vehicle device 50. In FIG. 1, in the in-vehicle display apparatus 11, the communication device 20 and the in-vehicle device 50 are provided in different housings, but the invention is not limited thereto. For example, the communication device 20 and the in-vehicle device 50 may be provided in a housing.

The communication device 20 is, for example, a mobile phone, a personal computer, or a smart phone that can be connected to the Web or the Internet, and is connected to the in-vehicle device 50 by, for example, wireless communication or a Universal Serial Bus (USB). The communication device 20 outputs various kinds of data, such as posted information, voice data, and map data, to the in-vehicle device 50 and performs various kinds of processes according to the content of the operation of the user input through, for example, a touch panel of the in-vehicle device 50.

The in-vehicle device 50 is a Display Audio (DA) that includes a liquid crystal monitor, such as a touch panel or a display, has basic functions, such as a display function, an audio reproducing function, and a communication function with a portable terminal, and cooperates with the communication device 20 to implement various functions. Therefore, the in-vehicle device 50 used in this embodiment is inexpensive, as compared to high-precision in-vehicle devices provided in the vehicle, and it is expected that the in-vehicle device 50 will be widely spread.

The in-vehicle device 50 according to this embodiment is not necessarily the DA, but may be a high-precision in-vehicle device having, for example, a navigation function. In this case, data (the content of posted information and geographical location data) except for the map is transmitted to the in-vehicle device 50 and the in-vehicle device 50 displays the content of the posted information on the map data that is locally stored.

The in-vehicle device 50 displays the posted information or map data received from the communication device 20 on the liquid crystal monitor and outputs the voice data received from the communication device 20 as a voice from the speaker. In addition, the in-vehicle device 50 transmits geographical location data, such as coordinates indicating an operation position, as information input through the display panel by the user to the communication device 20.

Figure 2:
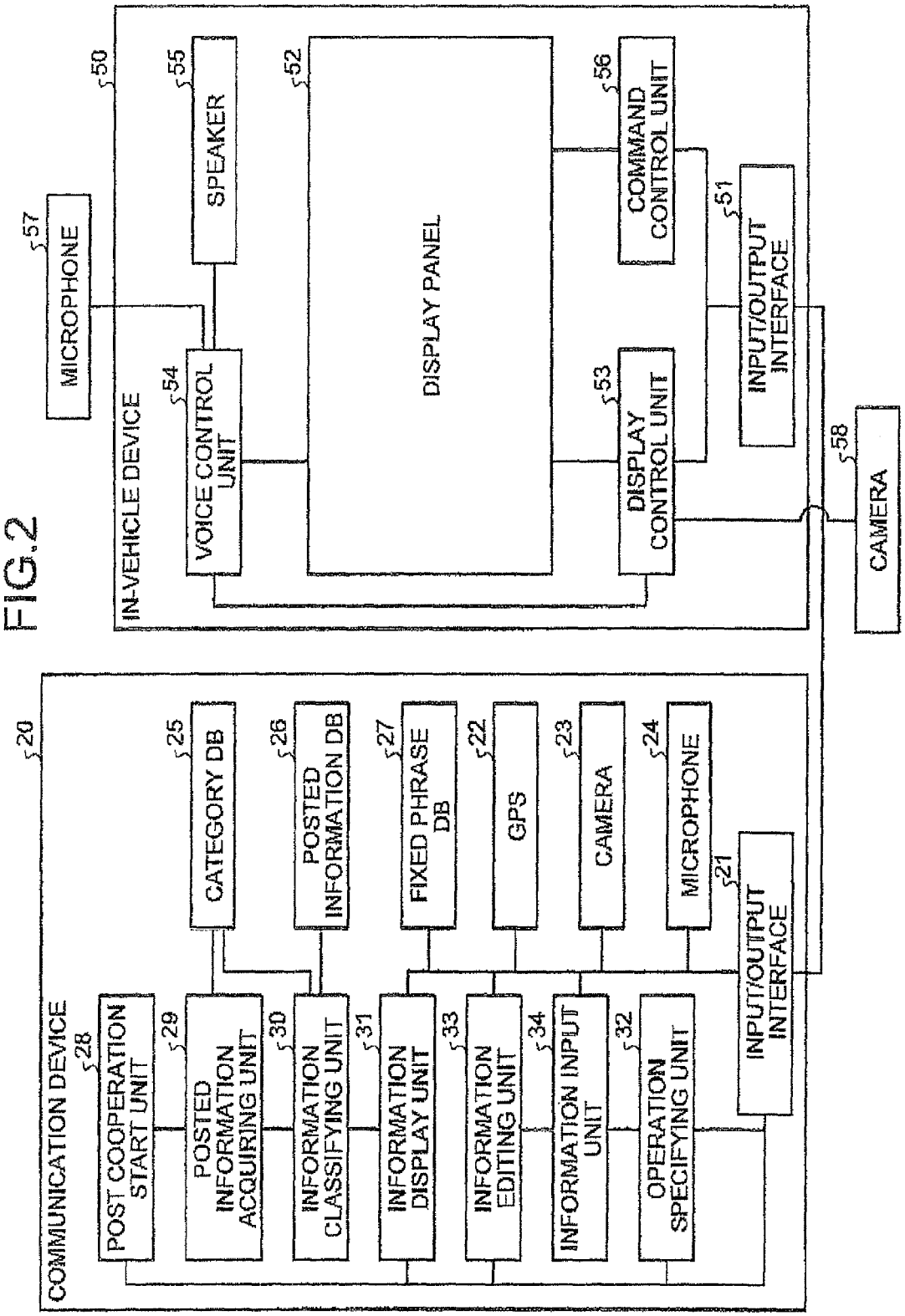
FIG. 2 is a block diagram illustrating the structure of the in-vehicle display apparatus.

Next, the structure of the in-vehicle display apparatus illustrated in FIG. 1 will be described with reference to FIG. 2. FIG. 2 is a block diagram illustrating the structure of the in-vehicle display apparatus. As illustrated in FIG. 2, the in-vehicle display apparatus 11 includes the communication device 20 and the in-vehicle device 50. Therefore, each of the communication device 20 and the in-vehicle device 50 will be described below.

The communication device 20 includes an input/output interface 21, a Global Positioning System (GPS) 22, a camera 23, a microphone 24, a category DataBase (DB) 25, a posted information DB 26, and a fixed phrase DB 27. The communication device 20 includes a post cooperation start unit 28, a posted information acquiring unit 29, an information classifying unit 30, an information display unit 31, an operation specifying unit 32, an information editing unit 33, and an information input unit 34.

Each of the functional units and the DBs is illustrative, but the functional units of the communication device 20 are not limited thereto. For example, the communication device 20 has a communication function or a Web communication function in addition to the functions of the units and includes, for example, a display.

The input/output interface 21 is cooperatively connected to the in-vehicle device 50 and is connected to the in-vehicle device 50 by, for example, wired communication, such as USB, or near field wireless communication, such as infrared communication or Bluetooth (registered trademark). For example, the input/output interface 21 transmits Joint Photographic Experts Group (JPEG) image data or Moving Picture Experts Group (MPEG) moving picture data, which is, for example, compressed posted information or map data, or voice data to the in-vehicle device 50. In addition, the input/output interface 21 receives, for example, the coordinates of the operation position of the user from the in-vehicle device 50.

The GPS 22 has a function of communicating with a GPS satellite and acquires the current position of the vehicle. For example, when receiving an instruction to acquire geographical location data from the information input unit 34, which will be described below, the GPS 22 communicates with the GPS satellite to acquire the current position, stores the acquired current position in a storage unit, such as a memory, and outputs the acquired geographical location data to the information input unit 34.

The camera 23 is provided inside or outside the vehicle and captures images or moving pictures. For example, when receiving an image capture instruction from the information input unit 34, which will be described below, the camera 23 captures a moving picture or an image, stores the captured moving picture or image in the storage unit, such as a memory, and outputs the captured data to the information input unit 34. The microphone 24 is provided inside or outside the vehicle and records a voice. For example, when receiving a recording instruction from the information input unit 34, which will be described below, the microphone 24 records a voice, stores the recorded voice in the storage unit, such as a memory, and outputs the recorded voice data to the information input unit 34. In the case of a mobile phone, the microphone 24 may be included in the mobile phone or it may be separately connected to the mobile phone.

The category DB 25 stores, for example, the classified categories of posted information or the display format of the classified posted information. FIG. 3 is a diagram illustrating an example of the information stored in the category DB. As illustrated in FIG. 3, the category DB 25 stores, for example, "#Tra, traffic/Traffic, and icon (speech bubble)/red," "#Wea, weather/Weather, and icon (speech bubble)/white," and "#Sce, scene/Scene, and icon (speech bubble)/green" as "tag, classified category, and display format." In addition, the category DB 25 stores, for example, "#Cus, custom/Custom, and icon (speech bubble)/yellow" and "#Inf, information/Information, and icon (speech bubble)/blue."

The stored "tag" indicates a hash tag included in posted information such as tweets. The "classified category" indicates a category into which the posted information is classified. The "display format" indicates a format or color when the posted information is displayed on the in-vehicle device 50.

For example, in the case of "#Tra, traffic/Traffic, and icon (speech bubble)/red," the posted information having "#Tra" as the hash tag is classified into a category "traffic" and is displayed as a speech-bubble-type red icon. In the case of "#Wea, weather/Weather, and icon (speech bubble)/white," the posted information having "#Wea" as the hash tag is classified into a category "weather" and is displayed as a speech-bubble-type white icon. In the case of "#Sce, scene/Scene, and icon (speech bubble)/green," the posted information having "#Sce" as the hash tag is classified into a category "scene" and is displayed as a speech-bubble-type green icon. In the case of "#Cus, custom/Custom, and icon (speech bubble)/yellow," the posted information having "#Cus" as the hash tag is classified into a category "custom" and is displayed as a speech-bubble-type yellow icon. In the case of "#Inf, information/Information, and icon (speech bubble)/blue," the posted information having "#Inf" as the hash tag is classified into a category "information" and is displayed as a speech-bubble-type blue icon.

For example, posted information, such as "tweets" used in Twitter (registered trademark), can be freely posted without any limitation in the amount and content thereof. However, in this case, the amount of information considerably increases, which makes it difficult to search for or acquire desired information. In contrast, the use of the "hash tag" makes it possible to easily acquire desired information at any time. In particular, during driving, it is possible to acquire desired information without a complicated operation. Therefore, the use of the hash tag is effective. As a result, when the "hash tag" is used to classify the categories, it is possible to rapidly specify (filter) the posted information to be displayed from a large amount of posted information.

The posted information DB 26 stores the posted information acquired from the Twitter server 1 and the classification destination of the posted information. FIG. 4 is a diagram illustrating an example of the information stored in the posted information DB. As illustrated in FIG. 4, the posted information DB 26 stores, for example, "2010/4/26 10:00:00, #Tra, traffic jam, oo intersection, Kobe-shi, Hyogo-ken, 111.jpeg, –, and traffic" as "post date and time, tag, content, geographical location data, moving picture, voice, and classification result." In addition, the posted information DB 26 stores, for example, "2010/4/26 10:00:02, #Wet, visibility is poor because of dense fog, oo 1-chome, Kobe-shi, Hyogo-ken, –, –, and –;" "2010/4/26 10:00:05, #Sce, beautiful scenery, Rokkosan xx, night view.mpeg, there is a moving picture, and scene" and "2010/4/26 10:00:15, #III, Now, 100 yen/L!, oo 3-chome, Kobe-shi, Hyogo-ken, –, –, and –."

The "post date and time" indicates the date and time when information is posted and the "tag" indicates a hash tag included in posted information such as tweets. The "content" indicates the content of posted information, that is, the content of tweets, and the "geographical location data" indicates the display position of the posted information. The "moving picture" indicates whether there is moving picture data added to the posted information. When there is moving picture data added to the posted information, a file name is stored. When there is no moving picture data added to the posted information, a sign "–" is stored. The "voice" indicates whether there is voice data added to the posted information. When there voice data added to the posted information, a file name is stored. When there is no voice data added to the posted information, a sign "–" is stored. The "classification result" indicates the classification result obtained by the information classifying unit 30, which will be described below. When the posted information cannot be classified, a sign "–" is stored and the posted information is removed from a display target.

For example, "2010/4/26 10:00:00, #Tra, traffic jam, oo intersection, Kobe-shi, Hyogo-ken, 111.jpeg, –, and traffic" indicates that posted information "traffic jam" that has a tag "#Tra," is posted at "oo intersection, Kobe-shi, Hyogo-ken" and has "111.jpeg" added thereto is posted at "2010/4/26 10:00:00" and is classified into the category "traffic." In addition, "2010/4/26 10:00:02, #Wet, visibility is poor because of dense fog, oo 1-chome, Kobe-shi, Hyogo-ken, –, –, and –" indicates that posted information "visibility is poor because of dense fog" which has a tag "#Wet," is posted at "oo 1-chome, Kobe-shi, Hyogo-ken" is posted at "2010/4/26 10:00:02" and is not classified into any category.

In addition, "2010/4/26 10:00:05, #Sce, beautiful scenery, Rokkosan xx, night view.mpeg, there is a moving picture, and scene" indicates that posted information "beautiful scenery" which has a tag "#Sce," is posted at "Rokkosan xx," and has "night view.mpeg" and voice data added thereto is posted at "2010/4/26 10:00:05" and is classified into the category "scene." Further, "2010/4/26 10:00:15, #III, Now, 100 yen/L!, oo 3-chome, Kobe-shi, Hyogo-ken, –, –, and –" indicates that posted information "Now, 100 yen/L!" which has a tag "#III" and is posted at "oo 3-chome, Kobe-shi, Hyogo-ken" is posted at "2010/4/26 10:00:15" and is not classified into any category.

The fixed phrase DB 27 stores the fixed phrases of the information posted by the user. FIG. 5 a diagram illustrating an example of the information stored in the fixed phrase DB. As illustrated in FIG. 5, the fixed phrase DB 27 stores a "post category" indicating the category of the posted information, a "fixed phrase" indicating the content of the posted information, and the "tag" of the posted information so as to be associated with each other.

For example, the fixed phrases in the category "traffic," which is the "post category," include "traffic jam, now, a byroad, danger!, a recommended place, and parking OK," and the tags thereof are "#Tra." The fixed phrases in the category "weather," which is the "post category," include "rain, snow, freezing, dense fog, rainstorm, and typhoon" and the tags thereof are #Wea." The fixed phrases in the category "scene," which is the "post category," include "delicious, beautiful scenery, and a great spot" and the tags thereof are "#Sce." The fixed phrase in the category "custom," which is the "post category," includes "what is it and a fireworks" and the tags thereof is "#Cus." The fixed phrases in the category "information," which is the "post category," include "gasoline and traffic jam is cleared" and the tags thereof are "#Inf."

The information stored in the fixed phrase DB 27 is displayed on the in-vehicle device 50. The "fixed phrase" selected by the user or the "fixed phrase" specified by voice recognition is posted as the posted information. The setting of the information stored in the category DB 25, the posted information DB 26, and the fixed phrase DB 27 may be arbitrarily changed by, for example, the user. Each of the category DB 25, the posted information DB 26, and the fixed phrase DB 27 is a semiconductor memory device, such as a Random Access Memory (RAM), or a storage device, such as a hard disk.

For example, the "tag," the "classified category," and the "display format" illustrated in FIG. 3 may be arbitrarily set and a combination thereof may be arbitrarily set. That is, the user can arbitrarily set the "tag," the classified "category," and the display thereof. Similarly, the "post category," the "fixed phrase," and the "tag" illustrated in FIG. 5 may be arbitrarily set and a combination thereof may be arbitrarily set. That is, the user can arbitrarily set an input "fixed phrase."

Returning to FIG. 2, the post cooperation start unit 28 performs a post cooperation of displaying the posted information on the in-vehicle device 50. For example, when detecting that the input/output interface 21 and the in-vehicle device 50 are connected to each other by, for example, a USB, the post cooperation start unit 28 generates image data of the initial screen (main menu) of the post cooperation in the communication device 20 and outputs the image data to the in-vehicle device 50. Then, the post cooperation start unit 28 acquires the resolution or size of, for example, a display of the connected in-vehicle device 50. Then, the post cooperation start unit 28 stores the coordinates of a display panel 52 of the in-vehicle device 50 and the coordinates of the image data of the initial screen in, for example, a memory so as to be associated with each other. As a result, the communication device 20 can specification the correspondence between the operation position on the display panel 52 of the in-vehicle device 50 and a position on the display of the communication device 20. Therefore, the communication device 20 can specify the content of the operation of the user from the coordinates received from the in-vehicle device 50.

As another method of performing post cooperation, when the user selects an icon indicating post cooperation, such as "TwitDrive," which is displayed on the display of the communication device 20, the post cooperation start unit 28 may receive the selection. Then, the post cooperation start unit 28 may control the input/output interface 21 to start connection to the in-vehicle device 50.

The posted information acquiring unit 29 acquires the information posted by the user and geographical location data indicating the destination of the posted information. Specifically, when receiving a signal indicating that the in-vehicle device 50 is operated to input an instruction to acquire posted information from the operation specifying unit 32, the posted information acquiring unit 29 is connected to the Twitter server 1 and acquires the posted information. Then, the posted information acquiring unit 29 stores the acquired posted information in a storage device, such as a memory, and outputs the acquired posted information to the information classifying unit 30. The posted information acquiring unit 29 may acquire the posted information at a predetermined time interval or the posted information may be transmitted from the Twitter server 1 in a PUSH manner.

For example, the posted information acquiring unit 29 acquires posted information "2010/05/11 12:00:15, #Tra, traffic jam, oo Tokyo, traffic jam.mpeg, and there is a voice" as "post date and time, tag, content, geographical location data, moving picture, and voice." The acquired "post date and time, tag, content, geographical location data, moving picture, and voice" is the same as that illustrated in FIG. 4 and a detailed description thereof will be omitted.

The information classifying unit 30 classifies the posted information acquired by the posted information acquiring unit 29 into the categories. Specifically, the information classifying unit 30 specifies a "tag" identical to the "hash tag" included in the posted information which is acquired by the posted information acquiring unit 29 from the category DB 25. When there is a "tag" identical to the "hash tag" of the posted information in the category DB 25, the information classifying unit 30 specifies the "category" associated with the "tag" identical to the "hash tag" as the classification destination of the posted information and stores the specified "category" and the posted information in the posted information DB 26 so as to be associated with each other. On the other hand, when there is no "tag" identical to the "hash tag" of the posted information in the category DB 25, the information classifying unit 30 stores a "category=–" and the posted information in the posted information DB 26 so as to be associated with each other.

For example, an example in which the posted information acquiring unit 29 acquires the posted information "2010/4/26 10:00:05, #Sce, beautiful scenery, Rokkosan xx, night view-.mpeg, and there is a moving picture" will be described below. In this case, the information classifying unit 30 searches for a tag identical to the "hash tag=#Sce" of the posted information from the category DB 25. Since there is a tag identical to the "hash tag=#Sce," the information classifying unit 30 specifies the category "scene" corresponding to the tag "#Sce." As a result, the information classifying unit 30 stores the posted information "2010/4/26 10:00:05, #Sce, beautiful scenery, Rokkosan xx, night view.mpeg, and there is a moving picture" in the posted information DB 26 so as to be associated with the category "scene."

An example in which the posted information acquiring unit 29 acquires posted information "2010/4/26 10:00:02, #Wet, visibility is poor because of dense fog, oo 1-chome, Kobe-shi, Hyogo-ken, –, and –" will be described below. In this case, the information classifying unit 30 searches for a tag identical to the "hash tag=#Wet" of the posted information from the category DB 25. Since there is no tag identical to the "hash tag=#Wet," the information classifying unit 30 determines a category corresponding to the tag "#Wet" to be "–." As a result, the information classifying unit 30 stores the posted information acquiring unit 29 acquires posted information "2010/4/26 10:00:02, #Wet, visibility is poor because of dense fog, oo 1-chome, Kobe-shi, Hyogo-ken, –, and –" in the posted information DB 26 so as to be associated with the category "–."

The information classifying unit 30 classifies all of the posted information acquired by the posted information acquiring unit 29. When 100 posted information items are acquired by the posted information acquiring unit 29, the information classifying unit 30 classifies the 100 posted information items into the categories and stores them in the posted information DB 26.

The information display unit 31 generates map data in which the posted information is displayed in a display format corresponding to the categories classified by the information classifying unit 30 at the position specified by the geographical location data which is acquired together with the posted information by the posted information acquiring unit 29. Specifically, the information display unit 31 performs (1) a process of acquiring map data at the current position of the vehicle, (2) a process of specifying the posted information in the vicinity of the current position, (3) a process of specifying a display format, (4) a process of generating map data to be displayed, and (5) a process of transmitting the map data to the in-vehicle device.

For example, as the process (1), the information display unit 31 acquires the current position of the in-vehicle display apparatus 11 using the GPS 22 and acquires map data corresponding to the acquired current position from the map server 3. Then, as the process (2), the information display unit 31 specifies posted information having geographical location data in the vicinity of the geographical location data acquired by the GPS 22 from the posted information DB 26. As the process (3), the information display unit 31 reads the specified posted information from the posted information DB 26, specifies a display format corresponding to the "tag" of the read posted information from the category DB 25, and generates posted information of the specified "display format." In this case, the information display unit 31 may add, for example, a "detailed button" for displaying moving picture data added to the posted information or reproducing voice data to an icon. As the process (4), the information display unit 31 specifies the posted position of the posted information on the basis of the geographical location data added to the posted information and adds the generated posted information onto the map data corresponding to the current position. The information display unit 31 repeatedly performs this process on each of the posted information items stored in the posted information DB 26 to generate new map data in which each of the posted information items is displayed on one map data item in a JPEG format. Then, as the process (5), the information display unit 31 outputs the generated new map data of the MG format to the in-vehicle device 50.

The vehicle provided with the in-vehicle display apparatus 11 is being moved, and the current position of the vehicle varies moment to moment. Therefore, the information display unit 31 repeatedly performs the processes (1) to (5) each time the current position of the vehicle changes. As a result, the in-vehicle device 50 can constantly display map data in which the icon of the posted information is illustrated on the map in the vicinity of the current position of the vehicle. The processes (1) to (5) are illustrative, but the invention is not limited thereto. For example, the processes (1) to (5) do not need to be performed in this order, and any method may be used as long as the information display unit 31 can generate the map data in which the posted information is displayed at the current position of the vehicle. For example, the information display unit 31 may add the available period to the map data acquired from the map server 3, store the map data in, for example, the memory, and reduce the number of times the map data is acquired from the map server 3.

When the user sets a "category" desired to be displayed, the information display unit 31 may perform the processes (3) to (5) only on a category identical to the "category" that the user wants to display, in the posted information specified in the process (2). That is, the information display unit 31 may filter the posted information to be displayed according to the setting of the user.

Returning to FIG. 2, the operation specifying unit 32 specifies the type of operation input by the user to the in-vehicle device 50. Specifically, the operation specifying unit 32 receives the coordinates of the operation position of the user from the in-vehicle device 50. Then, the operation specifying unit 32 specifies a selected portion on the currently displayed screen from the coordinates on the communication device 20 associated by the post cooperation start unit 28 and the coordinates on the in-vehicle device 50, thereby specifying the operation of the user. Then, the operation specifying unit 32 outputs the content of the specified operation or an operation instruction to, for example, the information editing unit 33 and the information input unit 34. For example, when the operation of the user is "pressing posted information," the operation specifying unit 32 outputs an operation instruction, such as an instruction to display the posted information in detail or an instruction to display a list of the posted information items, to the information editing unit 33 and the information input unit 34.

For example, when the operation of the user is "pressing posted information," the operation specifying unit 32 outputs en instruction to display the posted information in detail or an instruction to display a list of the posted information items to the information editing unit 33. When the operation of the user is "inputting posted information," the operation specifying unit 32 outputs an instruction to display the "fixed phrases" of the input posted information to the information input unit 34. When the operation of the user is "pressing the fixed phrase," the operation specifying unit 32 outputs an instruction to post the pressed "fixed phrase" to the information input unit 34.

The operation specifying unit 32 may specify a user voice corresponding to the "fixed phrase" using voice recognition and output an instruction to display the "fixed phrase" to the information input unit 34. For example, the operation specifying unit 32 transmits the voice signal input through the microphone 24 to the voice recognition server 4. Then, when the recognition result received from the voice recognition server 4 is information indicating the input of the pasted information, such as a "fixed phrase" or a "post input," the operation specifying unit 32 outputs an instruction to display the "fixed phrase" to the information input unit 34.

For example, the information editing unit 33 receives a signal indicating that an operation, such as "pressing posted information" or "pressing the detailed button of posted information" has been performed on the map data displayed on the in-vehicle device 50 from the operation specifying unit 32. Then, the information editing unit 33 acquires information related to the operated posted information from the posted information DB 26 and outputs the acquired moving picture data or voice data to the in-vehicle device 50. In this case, the information editing unit 33 may output the moving picture or the voice to the in-vehicle device 50 while reproducing the moving picture or the voice.

When receiving a signal indicating that an operation, such as "pressing posted information" or "pressing the detailed button of posted information," has been performed from the operation specifying unit 32, the information editing unit 33 determines whether there is another posted information item in the vicinity of the operated posted information. When there is another posted information item in the vicinity of the operated posted information, the information editing unit 33 sorts and displays all information items including the operated posted information and another posted information item. For example, the information editing unit 33 displays a list of the posted information items sorted in time series on the basis of the time when information is posted, a list of the posted information items sorted in increasing order of the distance from the operation position on the map, or a list of the posted information items sorted in each of the categories classified by the information classifying unit 30.

When an operation of posting information is done, the information input unit 34 posts the information. That is, when the user performs a posting operation on the image that is transmitted from the information display unit 31 to the in-vehicle device 50 and is then displayed on the in-vehicle device 50, the information input unit 34 generates image data in which each information item to be posted is displayed and transmits the image data to the in-vehicle device 50.

For example, the information input unit 34 receives a signal indicating that an operation, such as a "posted information input" operation, has been performed on the map data displayed on the in-vehicle device 50 from the operation specifying unit 32. Then, the information input unit 34 generates image data in which the fixed phrase of information that can be posted is displayed and outputs the image data to the in-vehicle device 50. Then, when the operation specifying unit 32 specifies a selected fixed phrase, the information input unit 34 generates image data in which the specified fixed phrase is displayed and outputs the image data to the in-vehicle device 50. In addition, the information input unit 34 transmits information in which the current geographical location data is added to the posted information to the Twitter server 1.

In this case, when the operation specifying unit 32 specifies that an operation of capturing a "moving picture" has been performed, the information input unit 34 starts the camera 23 to capture a moving picture, generates image data in which posted information having the captured moving picture data and a fixed phrase added to the captured moving picture data is displayed, and outputs the image data to the in-vehicle device 50. When the operation specifying unit 32 specifies that a "voice" recording operation has been performed, the information input unit 34 starts the microphone 24, records a voice, generates image data in which posted information having the recorded voice data and a fixed phrase added to the recorded voice data is displayed, and outputs the image data to the in-vehicle device 50.

The in-vehicle device 50 includes an input/output interface 51, a display panel 52, a display control unit 53, a voice control unit 54, a speaker 55, and a command control unit 56. The functional units are illustrative, but the functional units of the in-vehicle device 50 are limited thereto. For example, the in-vehicle device 50 may have for example, a navigation function in addition to the functions of the units. In addition, the in-vehicle device 50 may include a microphone 57 that collects a voice in the vehicle or a camera 58 that captures the moving pictures of the inside or outside of the vehicle.

The input/output interface 51 is cooperatively connected to the communication device 20 and is connected to the communication device 20 by, for example, wired communication, such as USB, or near field wireless communication, such as infrared communication or Bluetooth (registered trademark). For example, the input/output interface 51 receives JPEG image data or MPEG moving picture data, which is, for example, compressed posted information or map data, or voice data to the communication device 20. In addition, the input/output interface 51 transmits, for example, the coordinates of the operation position of the user from the communication device 20.

The display panel 52 is a display or a touch panel that displays image data input from the display control unit 53, which will be described below. The display control unit 53 displays the image data received from the communication device 20 through the input/output interface 51 on the display panel 52 and outputs voice data received from the communication device 20 to the voice control unit 54.

The voice control unit 54 receives the voice data from the display control unit 53 and stores the voice data. When receiving an instruction to output a voice through the display panel 52, the voice control unit 54 reproduces the instructed voice and outputs the voice from the speaker 55. The command control unit 56 specifies a position on the display panel 52 that is touched (operated) by the user and transmits the coordinates indicating the specified position to the communication device 20 through the input/output interface 51.

Next, an example of a screen that is generated by the communication device 20 and then displayed on the in-vehicle device 50 and the transition of the screen will be described with reference to FIGS. 6 to 14.

Figure 6:
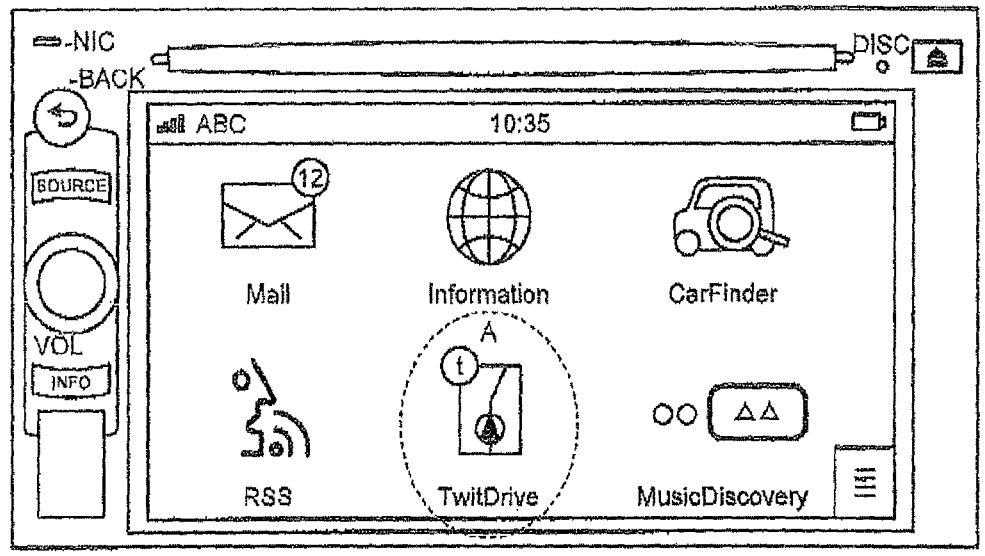
FIG. 6 is a diagram illustrating an initial screen in post cooperation between a communication device and an in-vehicle device.

First, FIG. 6 illustrates an initial screen of the post cooperation between the communication device and the in-vehicle device. When detecting that the input/output interface 21 and the in-vehicle device 50 are connected to each other by, for example, a USB, the post cooperation start unit 28 of the communication device 20 generates initial screen data illustrated in FIG. 6 and transmits it to the in-vehicle device 50. Then, the display control unit 53 of the in-vehicle device 50 displays the received screen illustrated in FIG. 6 on the display panel 52.

When the user selects "TwitDrive" illustrated in (A) of FIG. 6, the command control unit 56 of the in-vehicle device 50 transmits the coordinates indicating the position of the selected "TwitDrive" to the communication device 20. The operation specifying unit 32 of the communication device 20 specifies that the"TwitDrive" is selected from the received coordinates and outputs an instruction to acquire information to the posted information acquiring unit 29. In this case, the operation specifying unit 32 may display a main menu for user setting or filtering setting.

Thereafter, the information display unit 31 acquires the position of the vehicle using the GPS 22 and acquires map data corresponding to the acquired position of the vehicle from the map server 3. Then, the information display unit 31 transmits map data for the periphery of the vehicle as the initial screen of "TwitDrive" to the in-vehicle device 50 and the in-vehicle device 50 outputs the map data to the display panel 52.

Then, the information display unit 31 displays the posted information in a display format corresponding to the category classified by the information classifying unit 30 at a position on the map specified by the geographical location data which is acquired together with the posted information by the posted information acquiring unit 29.

Figure 7:
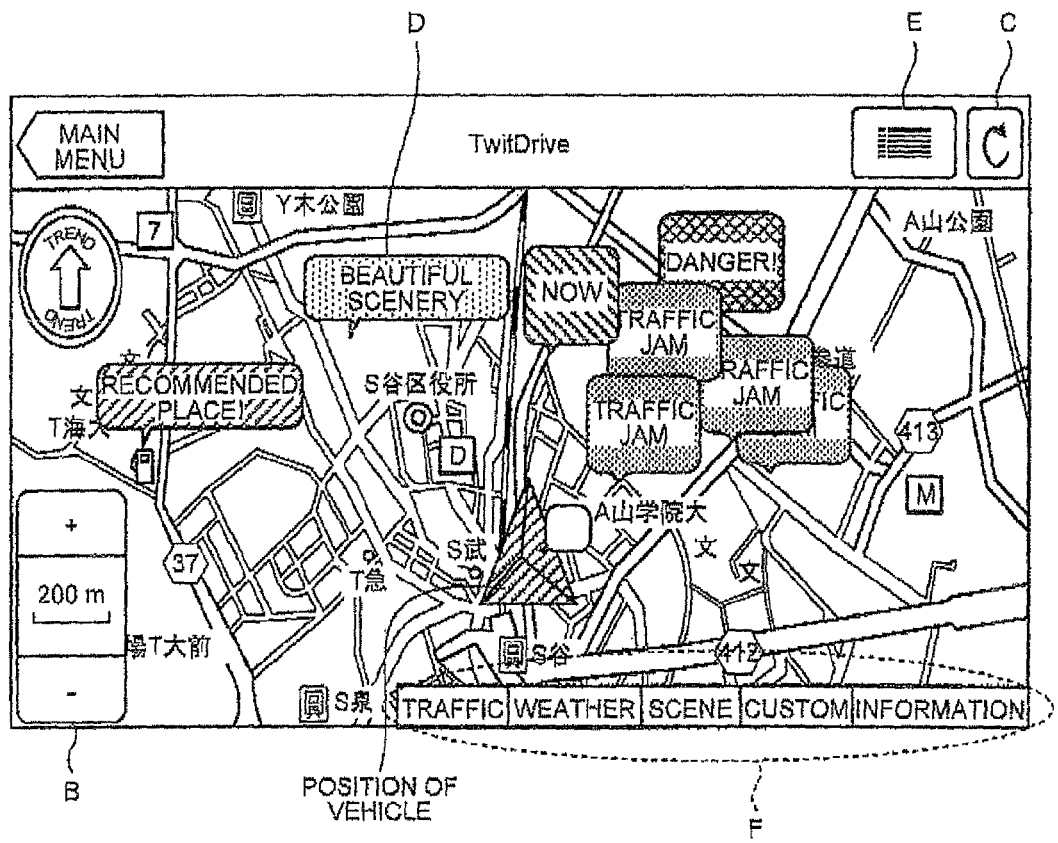
FIG. 7 is a diagram illustrating an example of a screen displayed by the post cooperation between the communication device and the in-vehicle device.

For example, as illustrated in FIG. 7, the information display unit 31 adds (B), (C), (D), (B), and (F) to the map data generated by the processes (1) to (5) to generate map data and displays the map data on the in-vehicle device 50. FIG. 7 illustrates an example of the screen displayed by the post cooperation between the communication device and the in-vehicle device. The screen illustrated in FIG. 7 is the map data generated by the processes (1) to (5).

Specifically, the information display unit 31 adds (B) a function of enlarging or reducing map data and (C) a function of refresh all of the data displayed on the screen. In addition, the information display unit 31 adds (E) a function of displaying a list of posted information items added to the map data and (F) a function of selecting the category of the posting information. (D) is the posted information generated by the processes (1) to (5).

Next, (B), (C), (D), (B), and (F) illustrated in FIG. 7 will be described. When "+" illustrated in (B) of FIG. 7 is selected on the in-vehicle device 50, the information display unit 31 generates screen data in which the displayed map data is enlarged and transmits the screen data to the in-vehicle device 50. The display control unit 53 of the in-vehicle device 50 displays the received enlarged screen data on the display panel 52. When "−" illustrated in (B) of FIG. 7 is selected, the information display unit 31 generate screen data in which the displayed map data is reduced and transmits the screen data to the in-vehicle device 50. The display control unit 53 of the in-vehicle device 50 displays the received reduced screen data on the display panel 52.

As a method of generating the enlarged screen data or the reduced screen data, the information display unit 31 acquires the enlarged map data or the reduced map data of the displayed screen data from the map server 3, generates screen data for displaying posted information from the acquired enlarged map data or the reduced map data using the same method as described above, and transmits the screen data to the in-vehicle device 50.

When (C) of FIG. 7 is selected on the in-vehicle device 50, the information display unit 31 transmits the previously displayed image data of the currently displayed image data to the in-vehicle device 50, and the display control unit 53 of the in-vehicle device 50 displays the received previous image data on the display panel 52. In this case, the map data and the posted information are updated by receiving current status from each corresponding server.

Figure 8:
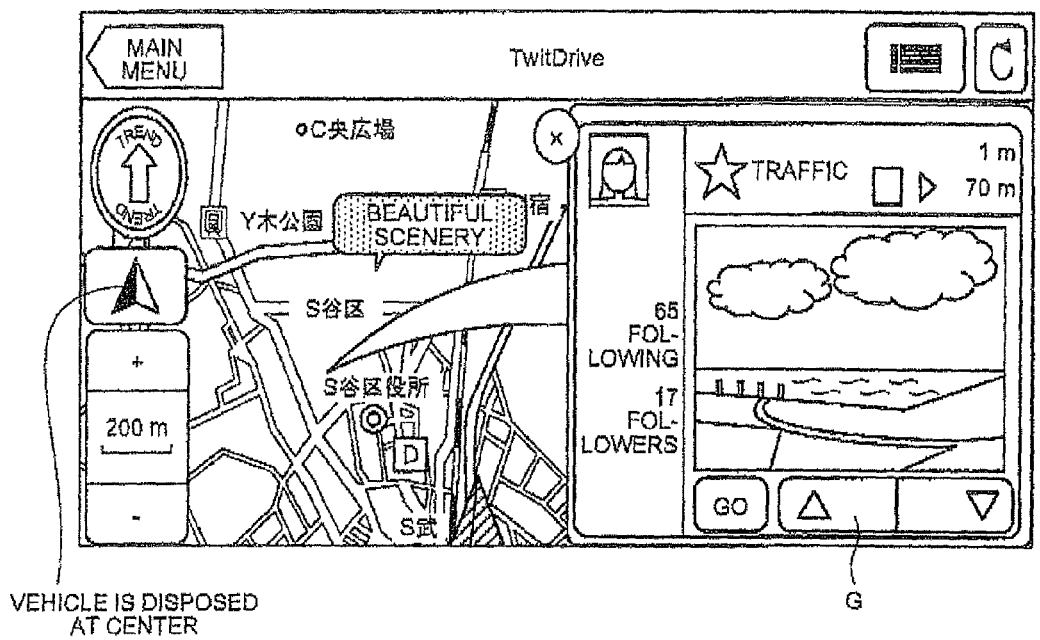
FIG. 8 is a diagram illustrating an example of the display of the detailed information of posted information.

When the posted information illustrated in (D) of FIG. 7 is selected on the in-vehicle device 50, the information editing unit 33 transmits the detailed information of the posted information illustrated in FIG. 8 to the in-vehicle device 50, and the display control unit 53 of the in-vehicle device 50 displays the detailed information of the received posted information an the display panel 52. FIG. 8 illustrates an example of the display of the detailed information of the posted information.

Specifically, as illustrated in FIG. 8, the information editing unit 33 acquires, for example, moving picture data or voice data in the posted information selected from FIG. 7 from the posted information DB 26 and transmits the acquired, data to the in-vehicle device 50. The display control unit 53 of the in-vehicle device 50 displays the received previous image data on the display panel 52. In the screen illustrated in FIG. 8, for example, the category of the selected posted information, image data added to the posted information, information about the user who posts the information, and the distance from the current position are displayed as the detailed information.

When "xx" illustrated in FIG. 8 is selected on the in-vehicle device 50, the information editing unit 33 closes the displayed detailed screen to return to the screen illustrated in FIG. 7. When "G" illustrated in FIG. 8 is selected on the in-vehicle device 50, the information editing unit 33 sequentially generates the detailed information of other posted information items in the vicinity of the displayed posted information and transmits the detailed information to the in-vehicle device 50. When the communication device 20 or the in-vehicle device 50 has a car navigation function and "GO" is selected on the screen illustrated in FIG. 8, the geographical location data of the posted information as transmit to navigation function, then starts route guidance to the displayed posted information.

Figure 9:
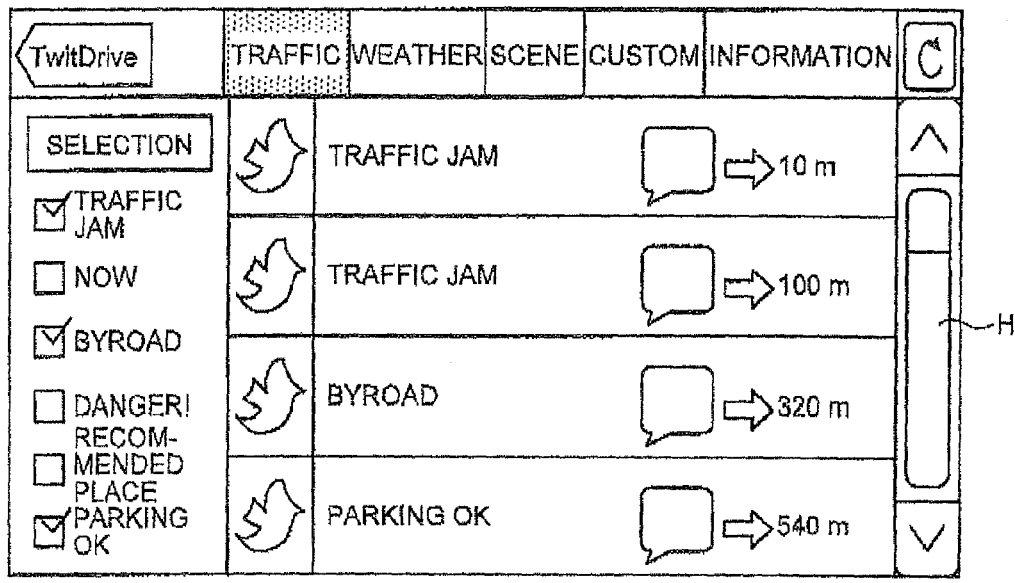
FIG. 9 is a diagram illustrating an example of the display of a list of posted information items.

Returning to FIG. 1, when (E) of FIG. 7 is selected on the in-vehicle device 50, the information editing unit 33 transmits a list of the posted information items displayed on the current map data to the in-vehicle device 50, and the display control unit 53 of the in-vehicle device 50 displays the list of the received posted information items on the display panel 52. FIG. 9 illustrates an example of the display of the list of the posted information items.

Specifically, as illustrated in FIG. 9, the information editing unit 33 classifies the posted information items displayed on the current map data into the categories "traffic, weather, scene, custom, and information" illustrated in FIG. 3 and generates screen data with tags capable of selecting the categories. In the screen illustrated in FIG. 9, tags capable of selecting the categories are provided and a list of the posted information items belonging to the category of a selected tag is displayed. In the list of the posted information items, the distance of the position of each posted information item from the current position is also displayed. In addition, operation buttons capable of selecting the posted information are displayed for each category. In FIG. 9, since items "traffic jam, byroad, and parking OK" are selected in the category "traffic," a list of only the items is displayed. In addition, when (H) of FIG. 9 is selected, the information editing unit 33 scrolls the displayed list in the selected direction.

Figure 10:
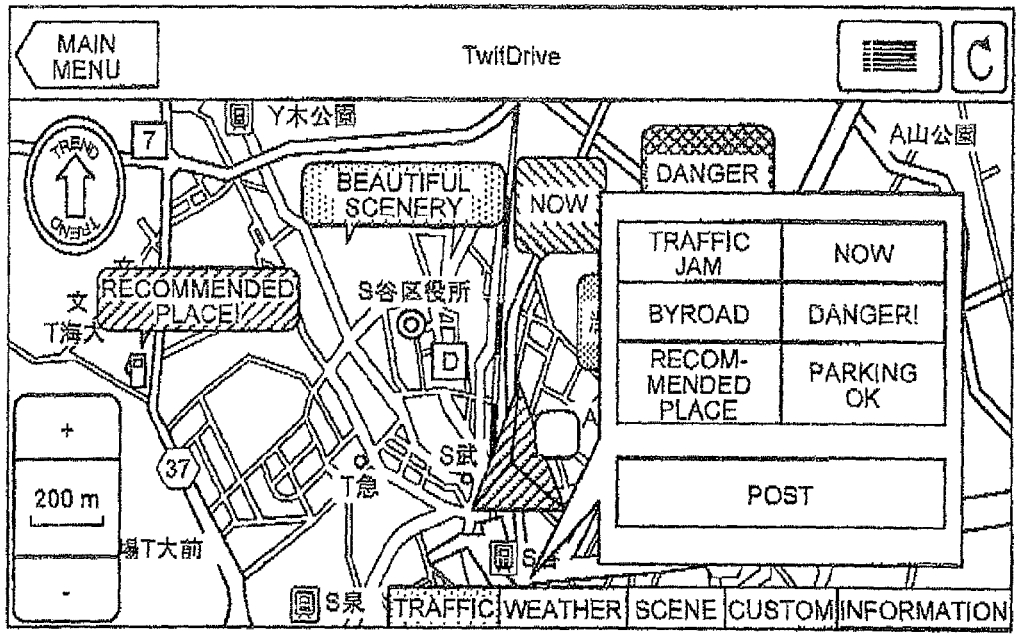
FIG. 10 is a diagram illustrating an example of the display of fixed phrases in a category (traffic)

Returning to FIG. 7, when (F) of FIG. 7 is selected on the in-vehicle device 50, the information input unit 34 transmits the fixed phrases of the posted information that can be input by the user to the in-vehicle device 50. The display control unit 53 of the in-vehicle device 50 displays image data including the received fixed phrase on the display panel 52. FIG. 10 is a diagram illustrating an example of the display of the fixed phrases of the category (traffic). (F) of FIG. 7 is data that is acquired from the "post categories" illustrated in FIG. 5 and is then displayed by the information display unit 31.

Specifically, when one of the "post categories" illustrated in (F) of FIG. 7 is selected, the information input unit 34 acquires the "fixed phrases" corresponding to the selected "post category" from the fixed phrase DB 27, generates image data in which the fixed phrases are added to the current display screen, and transmits the image data to the in-vehicle device 50. Then, the information input unit 34 generates new image data in which the "fixed phrases" selected on the in-vehicle device 50 are added at the current position of the vehicle in the display format illustrated in FIG. 3 and transmits the new image data to the in-vehicle device 50. When the "position of the vehicle" illustrated in FIG. 7 is selected, the information input unit 34 displays a list of the "fixed phrases" on the in-vehicle device 50, generates image data in which the selected "fixed phrases" are displayed, and transmits the image data to the in-vehicle device 50.

Figure 11:
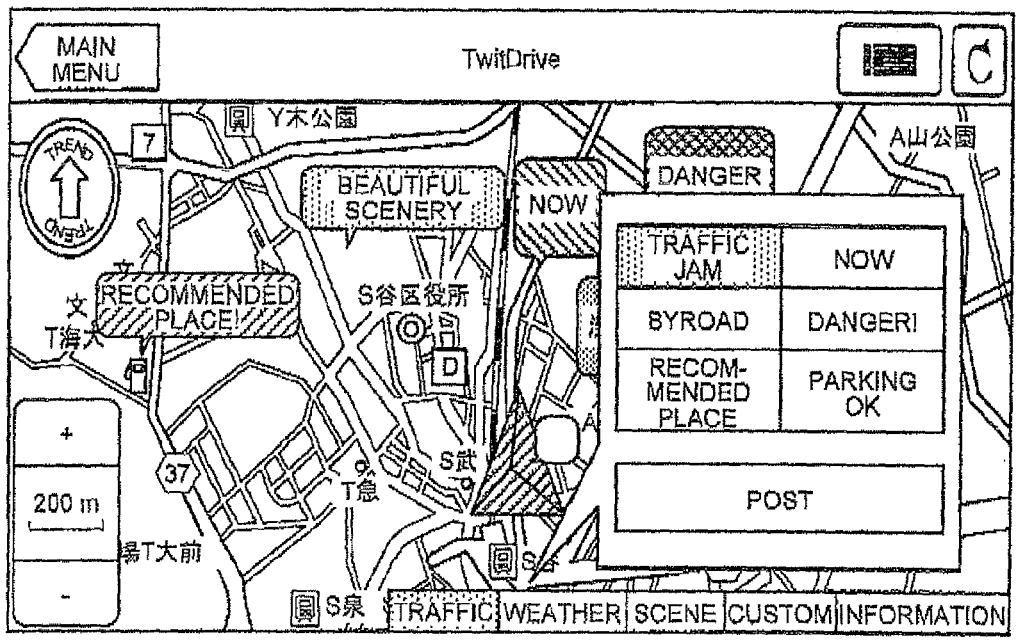
FIG. 11 is a diagram illustrating an example of the input of a fixed phrase (traffic jam) as the posted information.

For example, when the category "traffic" of the "post categories" illustrated in (F) of FIG. 7 is selected, the information input unit 34 acquires "fixed phrases (traffic jam, now, byroad, danger!, recommended place, and parking OK)" corresponding to the selected category "traffic" from the fixed phrase DB 27. Then, as illustrated in FIG. 10, the information input unit 34 generates image data in which the fixed phrases (traffic jam, now, byroad, danger!, recommended place, and parking OK) are added to the current display screen and transmits the image data to the in vehicle device 50. When the fixed phrase "traffic jam" is selected on the in-vehicle device 50, the information input unit 34 generates posted information in which the current geographical location data is added to the selected the fixed phrase "traffic jam." In addition, the information input unit 34 specifies the display format "red and icon" of the selected the fixed phrase "traffic jam" from the category DB 25. When the fixed phrase "post" is selected on the in-vehicle device 50, as illustrated in FIG. 11, the information input unit 34 generates image data in which the posted information "traffic jam" is displayed at the current position of the vehicle in the specified display format and transmits the image data to the in-vehicle device 50. In this case, the information input unit 34 also transmits the generated posted information to the Twitter server 1.

Figure 12:
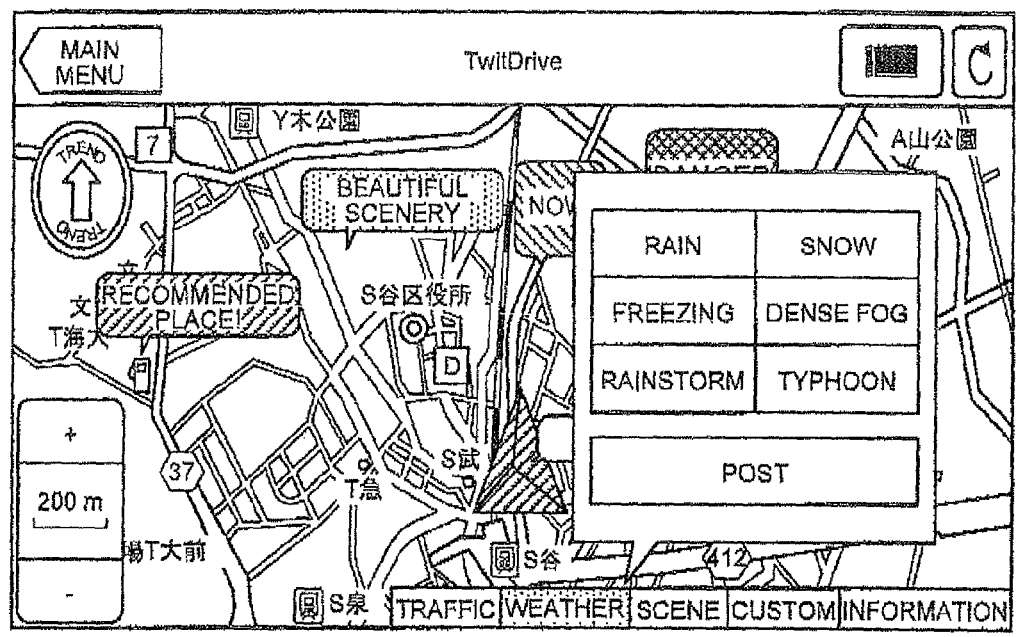
FIG. 12 is a diagram illustrating an example of the display of fixed phrases in a category (weather)
Figure 13:
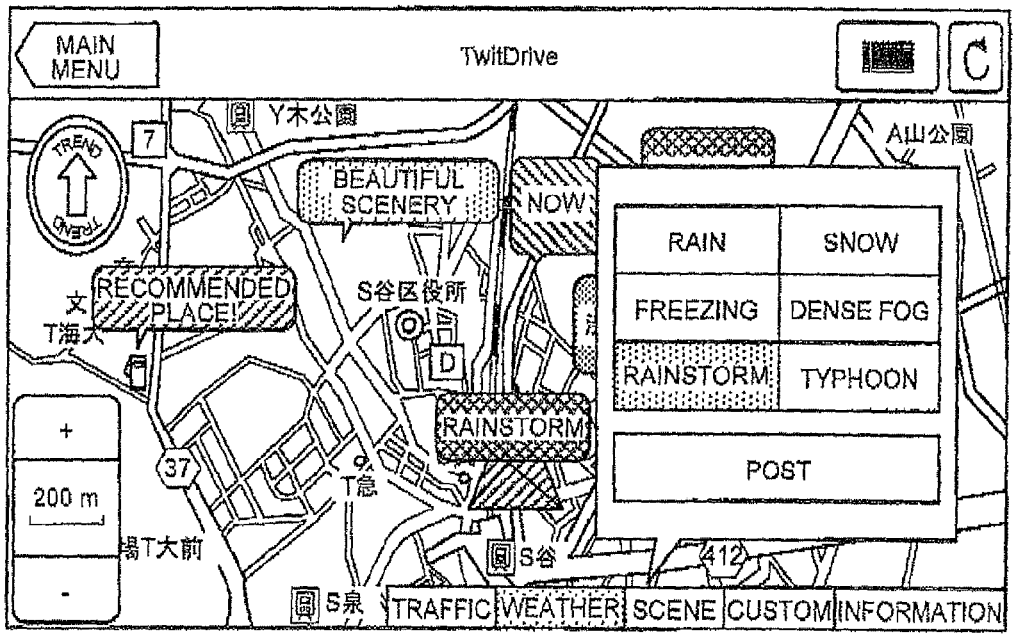
FIG. 13 is a diagram illustrating an example of the input of a fixed phrase (rainstorm) as the posted information.

As another example, when the category "weather" of the "post categories" illustrated in (F) of FIG. 7 is selected, the information input unit 34 acquires the "fixed phrases (rain, snow, freezing, dense fog, rainstorm, and typhoon)" corresponding to the selected category "weather" from the fixed phrase DB 27. Then, as illustrated in FIG. 12, the information input unit 34 generates image data in which the fixed phrases (rain, snow, freezing, dense fog, rainstorm, and typhoon) are added to the current display screen and transmits the image data to the in-vehicle device 50. Then, when the fixed phrase "rainstorm" is selected on the in-vehicle device 50, the information input unit 34 generates posted information in which the current geographical location data is added to the selected fixed phrase "rainstorm." In addition, the information input unit 34 specifies the display format "white and icon" of the selected "rainstorm" from the category DB 25. When the fixed phrase "post" is selected on the in-vehicle device 50, as illustrated in FIG. 13, the information input unit 34 generates image data in which the posted information "rainstorm" is displayed in the specified display format at the current position of the vehicle and transmits the image data to the in-vehicle device 50. In this case, the information input unit 34 also transmits the generated posted information to the Twitter server 1.

FIG. 11 is a diagram illustrating an example of the input of the fixed phrases (traffic jam) as the posted information. FIG. 12 is a diagram illustrating an example of the display of the fixed phrases of the category (weather). FIG. 13 is a diagram illustrating an example of the input of the fixed phrase (rainstorm) as the posted information.

Figure 14:
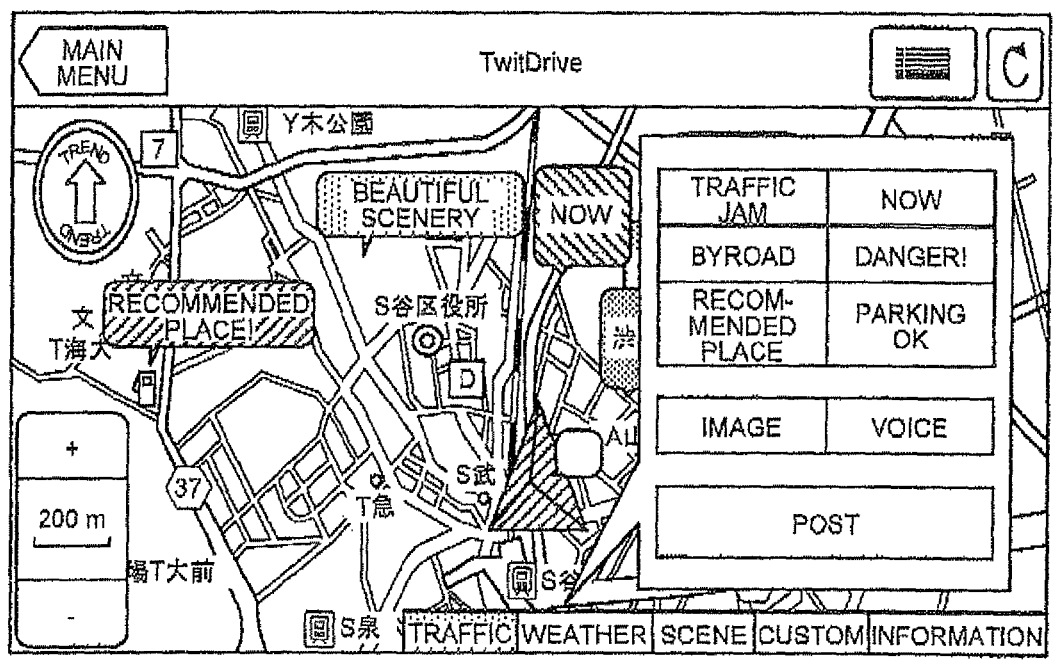
FIG. 14 is a diagram illustrating an example of a screen on which a list of fixed phrases, a moving picture capture button, and a voice recording button are displayed.

As illustrated in FIG. 14, the information input unit 34 may display buttons for selecting the fixed phrases "image" and "voice" in the list of the fixed phrases. When the fixed phrase "image" is selected by the in-vehicle device 50, the information input unit 34 may start the camera 23 to capture peripheral moving pictures and use information in which the captured moving picture data is combined with the posted information. When the "voice" is selected by the in-vehicle device 50, the information input unit 34 may start the microphone 24 to record a voice and use information in which the recorded voice data is combined with the fixed phrase as the posted information. FIG. 14 is a diagram illustrating an example of the screen on which a list of the fixed phrases, a moving picture capture button, and a voice recording button are displayed.

The information input unit 34 may post the "fixed phrases" using voice recognition. For example, when receiving an instruction to display the "fixed phrases" from the operation specifying unit 32, the information input unit 34 transmits a list of the "fixed phrases" to the in-vehicle device 50. Then, the information input unit 34 transmits the voice signal input through the microphone 24 to the voice recognition server 4. When the recognition result received from the voice recognition server 4 corresponds to any one of the "fixed phrases," the information input unit 34 generates image data having the corresponding "fixed phrase" as the posted information and transmits the image data to the in-vehicle device 50. That is, the information input unit 34 may post the "fixed phrase" specified by voice recognition.

When the recognition result received from the voice recognition server 4 is posted information, such as the posted information "traffic jam, the information input unit 34 generates image data having "traffic jam" as the posted information and transmits the image data to the in-vehicle device 50. That is, the information input unit 34 may recognize the voice of the "posted information" in addition to the voice of the "fixed phrase" and post them.

Figure 15:
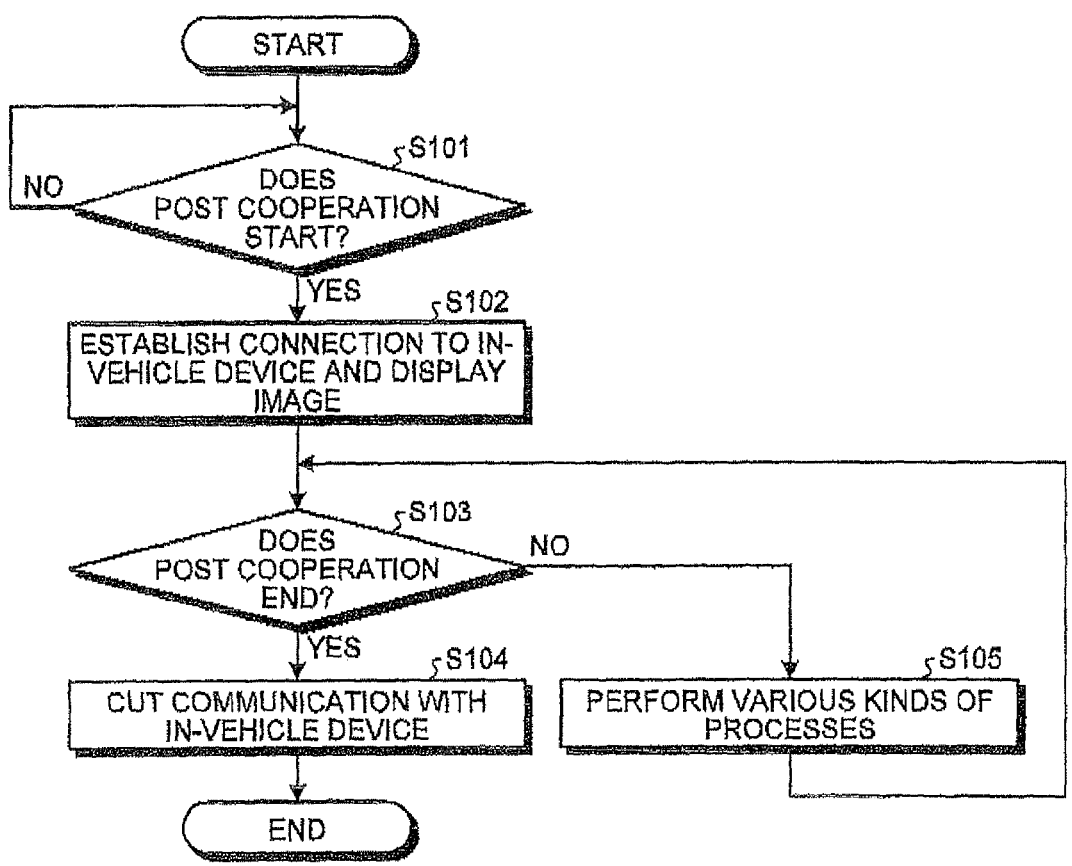
FIG. 15 is a flowchart illustrating the flow of a post cooperation start process of the communication device.
Figure 16:
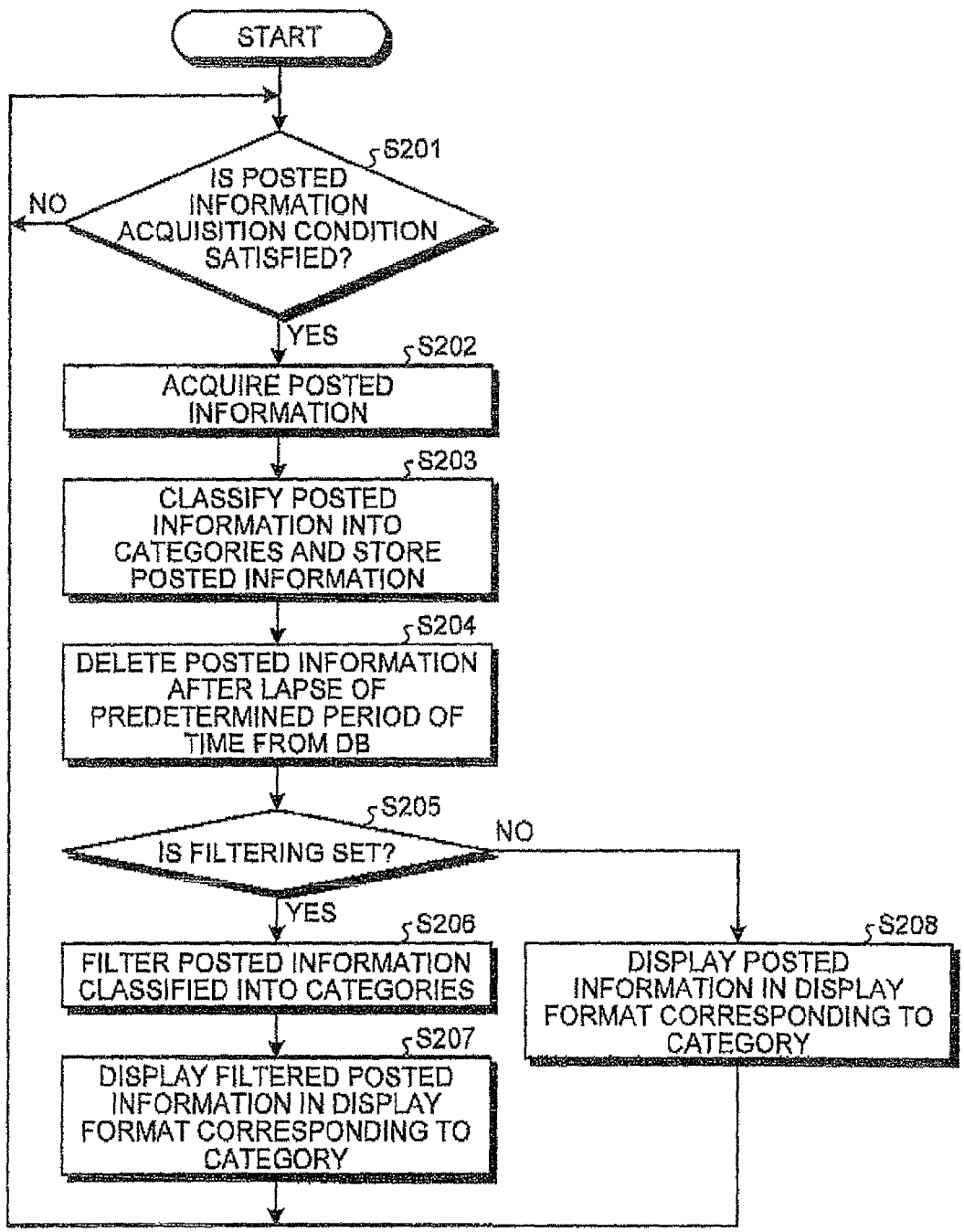
FIG. 16 is a flowchart illustrating the flow of a posted information display process of the communication device.
Figure 17:
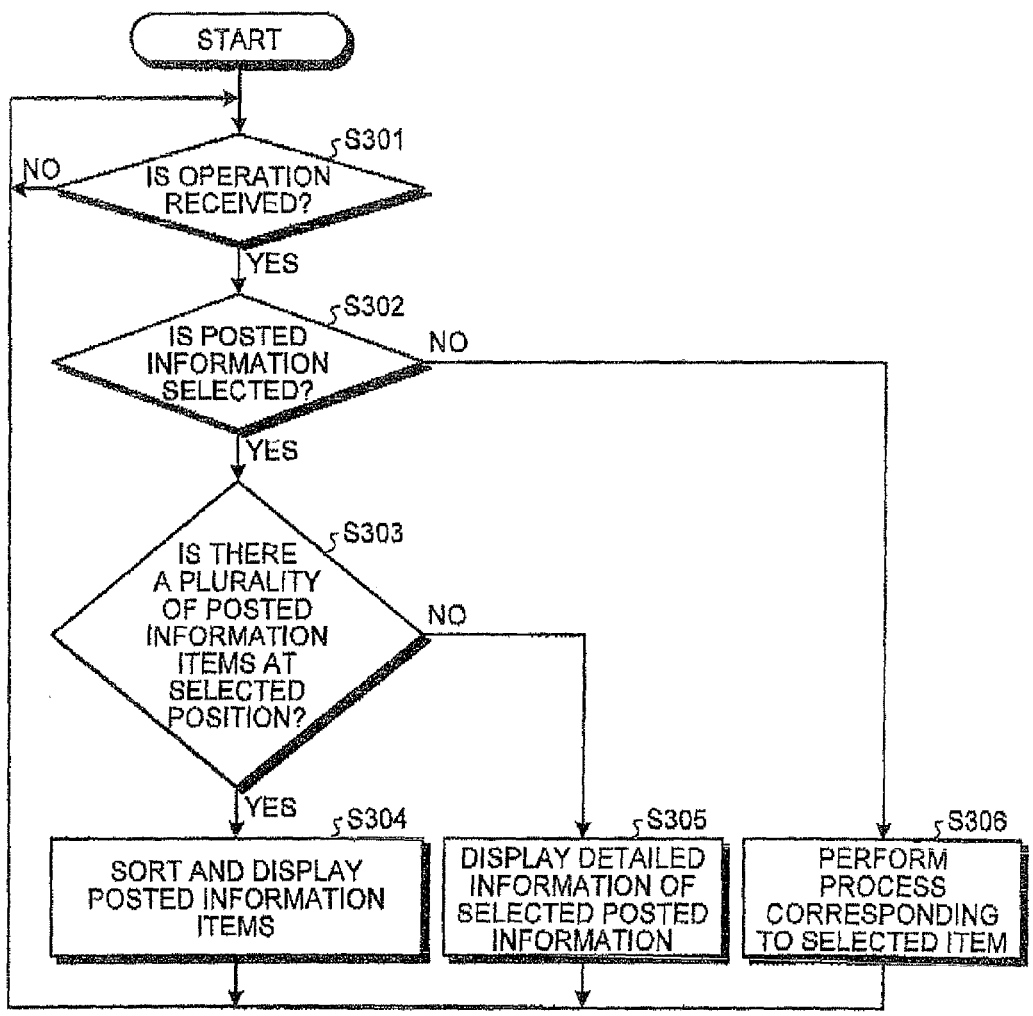
FIG. 17 is a flowchart illustrating the flow of a posted information selecting process of the communication device.
Figure 18:
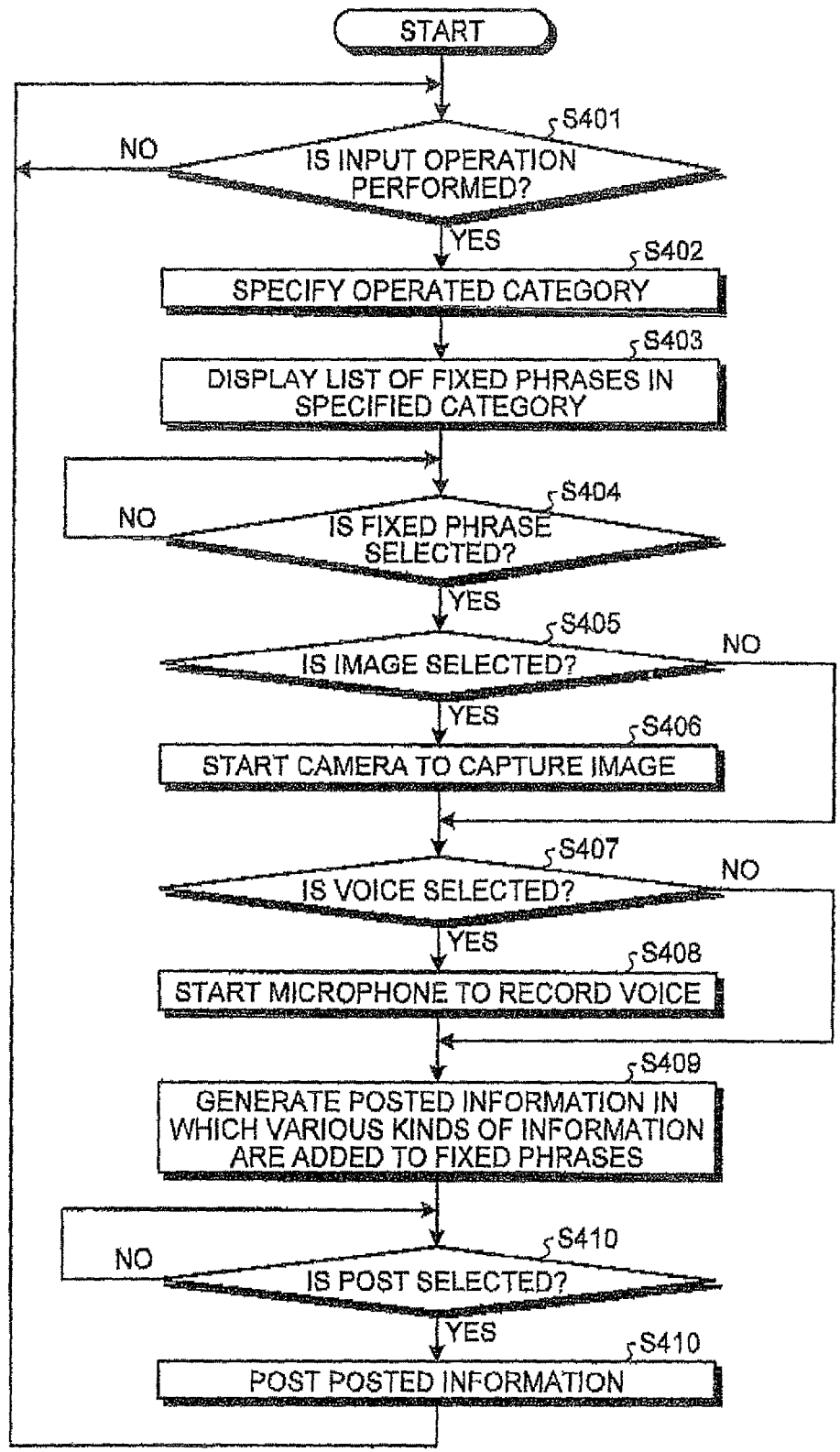
FIG. 18 is a flowchart illustrating the flow of a posted information input process of the communication device.

Next, the flow of a process of the in-vehicle display apparatus will be described with reference to FIGS. 15 to 18. FIG. 15 is a flowchart illustrating the flow of a post cooperation start process of the communication device. FIG. 16 is a flowchart illustrating the flow of a posted information display process of the communication device. FIG. 17 is a flowchart illustrating the flow of a posted information selecting process of the communication device. FIG. 18 is a flowchart illustrating the flow of a posted information input process of the communication device.

As illustrated in FIG. 15, when the input/output interface 21 and the in-vehicle device 50 are connected to each other by, for example, a USB and post cooperation starts (Yes in step S101), the post cooperation start unit 28 establishes connection to the in-vehicle device 50 (Step S102).

Then, when the operation specifying unit 32 specifies that a post cooperation end operation is performed on the in-vehicle device 50 (Yes in Step S103), the post cooperation start unit 28 cuts communication with the in-vehicle device 50 and ends the process (Step S104).

Until the operation specifying unit 32 specifies that the post cooperation end operation is performed on the in-vehicle device 50 (No in Step S103) the post cooperation start unit 28 performs various kinds of processes described with reference to FIGS. 16 to 18 (step S105).

As illustrated in FIG. 16, when a posted information acquisition condition is satisfied (Yes in Step S201), the posted information acquiring unit 29 acquires the information posted by the user or other users and geographical location data indicating the destination of the posted information from the Twitter server 1 (Step S202).

Then, the information classifying unit 30 specifies a "tag" identical to the "hash tag" included in the posted information acquired by the posted information acquiring unit 29 from the category DB 25, classifies all of the posted information acquired by the posted information acquiring unit 29 into the categories, and stores the posted information in the posted information DB 26 (Step S203). The information classifying unit 30 determines the posted information after a predetermined period of time has elapsed from the storage of the posted information in the posted information DB 26 or the posted information after a predetermined period of time has elapsed from the "date and time" included in the posted information to be old information and deletes the posted information from the posted information DB 26 (Step S204).

Then, when filtering is set to the posted information stored in the posted information DB 26 (Yes in Step S205), the information display unit 31 filters the posted information stored in the posted information DB 26 (Step S206). Then, the information display unit 31 performs the processes (1) to (5) on the filtered posted information to generate new map data in which the posted information is displayed on the map data, and transmits the new map data to the in-vehicle device 50 such that the map data is displayed on the display panel 52 of the in-vehicle device 50 (Step S207).

On the other hand, when filtering is not set to the posted information stored in the posted information DB 26 (No in Step S205), the information display unit 31 performs Step S208. That is, the information display unit 31 performs the processes (1) to (5) on the posted information stored in the posted information DB 26 to generate new map data in which the posted information is displayed on the map data and transmits the new map data to the in-vehicle device 50 such that the map data is displayed on the display panel 52 of the in-vehicle device 50. When Step S207 or Step S208 is performed, the process returns to Step S201 and step S201 and the subsequent steps are performed.

As illustrated in FIG. 17, when the user operation received by the in-vehicle device 50 is specified by the operation specifying unit 32 (Yes in Step S301), the information editing unit 33 determines whether the specified operation is for selecting posted information (Step S302).

Then, when the specified operation is for selecting posted information (Yes in Step S302), the information editing unit 33 determines whether there is a plurality of posted information items at the selected position (Step S303).

When there is a plurality of posted information items at the selected position (Yes in Step S303), the information editing unit 33 generates image data in which the plurality of posted information items is sorted and displays the image to the in-vehicle device 50 (Step S304). For example, as illustrated in FIG. 8, the information editing unit 33 displays the detailed information of one posted information item so as to be scrolled. In addition, as illustrated in FIG. 9, the information editing unit 33 sorts the posted information items displayed on the current map data into the categories "traffic, weather, scene, custom, and information" illustrated in FIG. 3, provides tags capable of selecting the categories, and displays the tags.

On the other hand, when a plurality of posted information items is not present at the selected position (Non in Step S303), the information editing unit 33 generates image data in which the detailed information of only a selected posted information item is displayed and displays the image data on the in-vehicle device 50 (Step S305).

In Step S302, when the specified operation is not for selecting posted information (No in Step S302), the information editing unit 33 performs a process corresponding to the selected process (Step S306). For example, as described with reference to FIG. 7, the information editing unit 33 returns to the previous screen, enlarges/reduces the screen, or returns to the main menu. When Steps S304 to S306 are performed, the process returns to Step S301 and Step S301 and the subsequent steps are performed.

As illustrated in FIG. 18, when the operation specifying unit 32 specifies that the user operation received by the in-vehicle device 50 is an input operation (Yes in Step S401), the information input unit 34 specifies a category corresponding to the specified operation (Step S402).

Then, the information input unit 34 acquires the fixed phrases of the specified category from the fixed phrase DB 27, generates map data in which a list of the acquired fixed phrases is displayed on the current map, and displays the map data on the in-vehicle device 50 (Step S403). In this case, the information input unit 34 may display buttons for selecting an "image" and a "voice" on the list of the fixed phrases.

When the operation specifying unit 32 specifies that the in-vehicle device 50 selects the fixed phrase (Yes in Step S404), the information input unit 34 determines whether the "image" button is selected with the selection of the fixed phrase (Step S405).

When the operation specifying unit 32 specifies that the fixed phrase and the "image" button are selected by the in-vehicle device 50 (Yes in Step S405), the information input unit 34 starts the camera 23 to capture peripheral moving pictures (Step S406). Then, the information input unit 34 determines whether a "voice" button is selected (Step S407). When it is determined in Step S405 that the "image" button is selected (No in Step S405), the information input unit 34 performs Step S407. The determination operations in Step S405 and Step S407 may be performed in any order.

When the operation specifying unit 32 specifies that the "voice" button is selected (Yes in Step S407), the information input unit 34 starts the microphone 24 to record a voice (Step S408). When it is determined in Step S407 that the "voice" button is not selected (No in Step S407), the information input unit 34 performs Step S409.

Then, the information input unit 34 generates posted information in which the current geographical location data and the moving picture data or the voice data are added to the selected "fixed phrase" (Step S409). When the operation specifying unit 32 specifies that the "post" button is selected by the in-vehicle device 50 (Yes in Step S410), the information input unit 34 posts the generated posted information (Step S411). When Step S411 is performed, the process returns to Step S401 and Step S401 and the subsequent steps are performed.

That is, when the fixed phrase "post" is selected on the in-vehicle device 50, the information input unit 34 generates image data in which the posted information is displayed at the current position of the vehicle in a display format corresponding to the generated posted information and transmits the image data to the in-vehicle device 50. In this case, the information input unit 34 also transmits the generated posted information to the Twitter server 1.

As such, according to the first embodiment, it is possible to classify the posted information, such as Twitter, posted in real time into the categories which are designated by the user in advance and display the posted information on the in-vehicle device 50 in the display formats corresponding to the classified categories. Therefore, it is possible to know the content of the posted information displayed on the in-vehicle device 50 at a glance, without hindering safe driving.

In addition, it is possible to display the posted information in an icon shape, such as a speech bubble, and the posted information is posted by selecting the fixed phrases that are prepared in advance. Therefore, it is not necessary to input characters and the posted information is displayed in an icon shape having fixed words written therein. Therefore, it is easy for the user to comprehend the content of the posted information during driving only by viewing the screen as a side glance and it is possible to prevent distracted driving. Since the posted information is represented by the speech bubbles, it is easy for the user to intuitively comprehend the information transmitted (posted) by other users at the spots. This structure makes the user feel as if the user communicates with other persons. Therefore, information exchange between the users is activated and useful information is obtained, which results in a nice drive.

In addition, it is possible to provide a nice drive, pleasantness, and a sense of security that the driver is connected to someone and support safe driving with the real-time acquisition of information, while paying attention to "easy transmission of information in real time," which is a characteristic of Twitter (registered trademark).

When a large amount of posted information suitable for the taste of the user (driver) is posted, the in-vehicle display apparatus according to this embodiment of the invention may notify the position of the posted information to the user. That is, when a large amount of posted information corresponding to the hobby or taste of the user is posted, the in-vehicle display apparatus may notify the position of the posted information to the user using a direction in which a large amount of information is posted as a "trend" direction.

For example, the communication device 20 stores profile information including, for example, a "name, an address, a taste, and preferential display information" illustrated in FIG. 19 in a storage unit, such as a memory. FIG. 19 is a diagram illustrating an example of the profile information. In addition, the in-vehicle device 50 displays the screen illustrated in FIG. 20 in which the "trend" direction (Z) is the "north" direction, which is a default direction.

Figure 21:
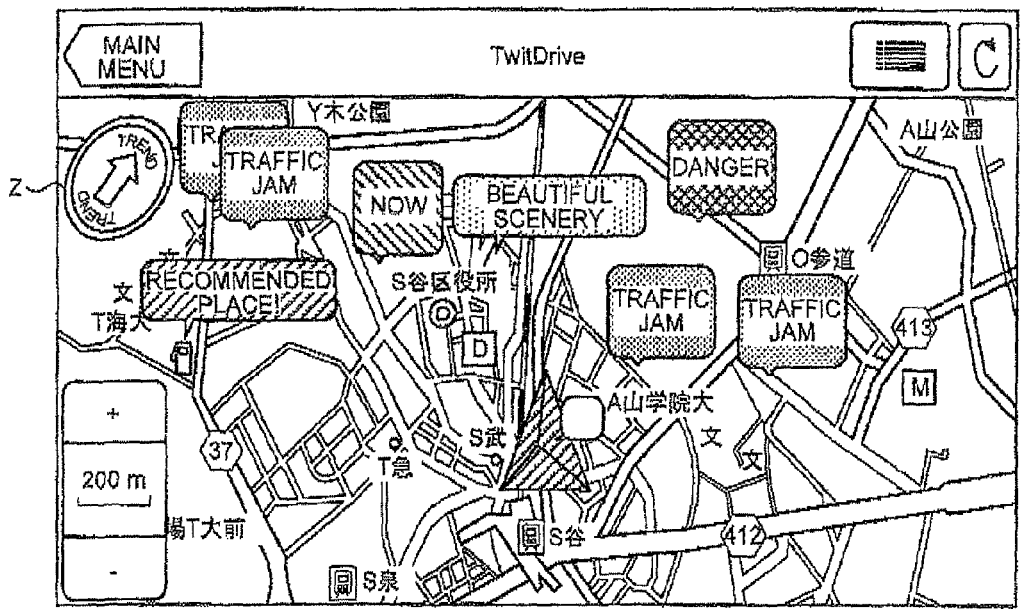
FIG. 21 is a diagram illustrating an example in which a large amount of information identical to the taste of the user is posted in the northeast direction.

In this state, similar to the first embodiment, the communication device 20 acquires the posted information from the Twitter server 1, classifies the posted information, and stores the posted information in the posted information DB 26. Then, the communication device 20 performs the processes (1) to (5) on the posted information stored in the posted information DB 26 to generate image data having the posted information. In this case, the communication device 20 detects a place where "10" or more posted information items are fixed in the generated image data. The communication device 20 determines whether the number of information items identical to the profile "preferential display information" of the user is "7 or more." When it is determined that the number of information items identical to the profile "preferential display information" of the user is "7 or more," the communication device 20 generates image data in which the "trend" direction is aligned with the direction of the posted information identical to the profile to the in-vehicle device 50, as illustrated in FIG. 21. As can be seen from the example illustrated in FIG. 21, since the "trend" direction (Z) is the northeast direction, a large amount of information that the user is interested in is posted from the current position to the northeast direction. The numerical values described in this embodiment are illustrative, but the invention is not limited thereto.

Figure 20:
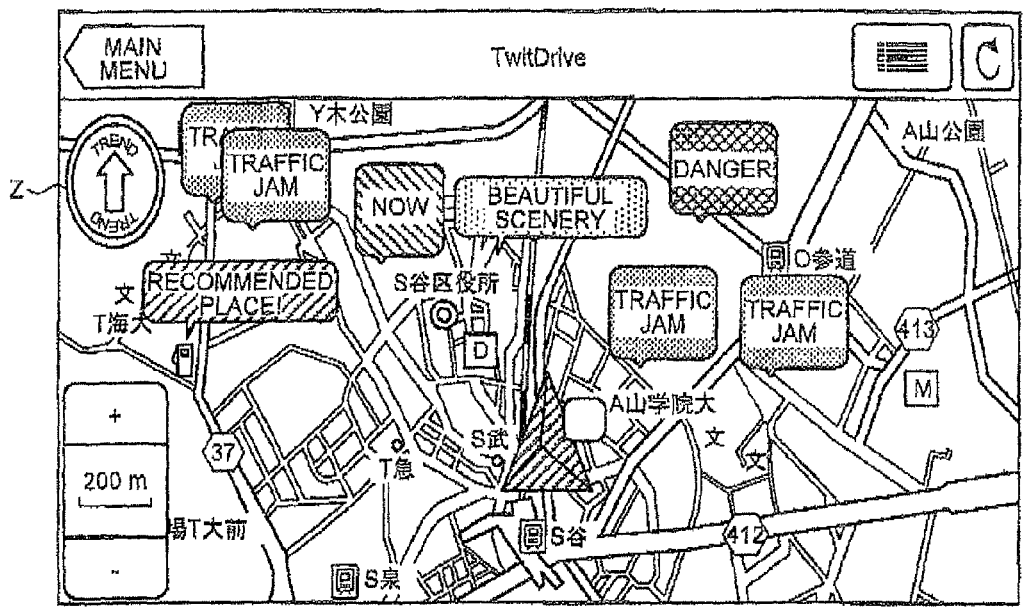
FIG. 20 is a diagram illustrating an example of a screen on which the posted information is displayed.

As a result, the user can simply acquire real-time information related to his or her hobby or taste. In addition, the user can simply grasp the direction of useful posted information with the arrow of "trend." Therefore, it is possible to know the content of the posted information displayed on the in-vehicle device 50 at a glance, without hindering safe driving and thus support a nice drive. FIG. 20 is a diagram illustrating an example of the screen on which the posted information is displayed and FIG. 21 is a diagram illustrating an example in which a large amount of information identical to the taste of the user is posted in the northeast direction.

The target arranged in the "trend" direction is not limited to the posted information identical to the profile of the user. For example, the direction of the arrow of the trend may be arbitrarily set when important posted information that prompts safe driving is continuously posted within a predetermined period of time, or depending on the post conditions of information, such as a direction in which the amount of posted information rapidly increases, as compared to the previous data.

In the first embodiment, the in-vehicle display apparatus does not have map data, but the invention is not limited thereto. The in-vehicle display apparatus may have map data. In a third embodiment, an example in which the in-vehicle display apparatus has map data will be described.

Figure 22:
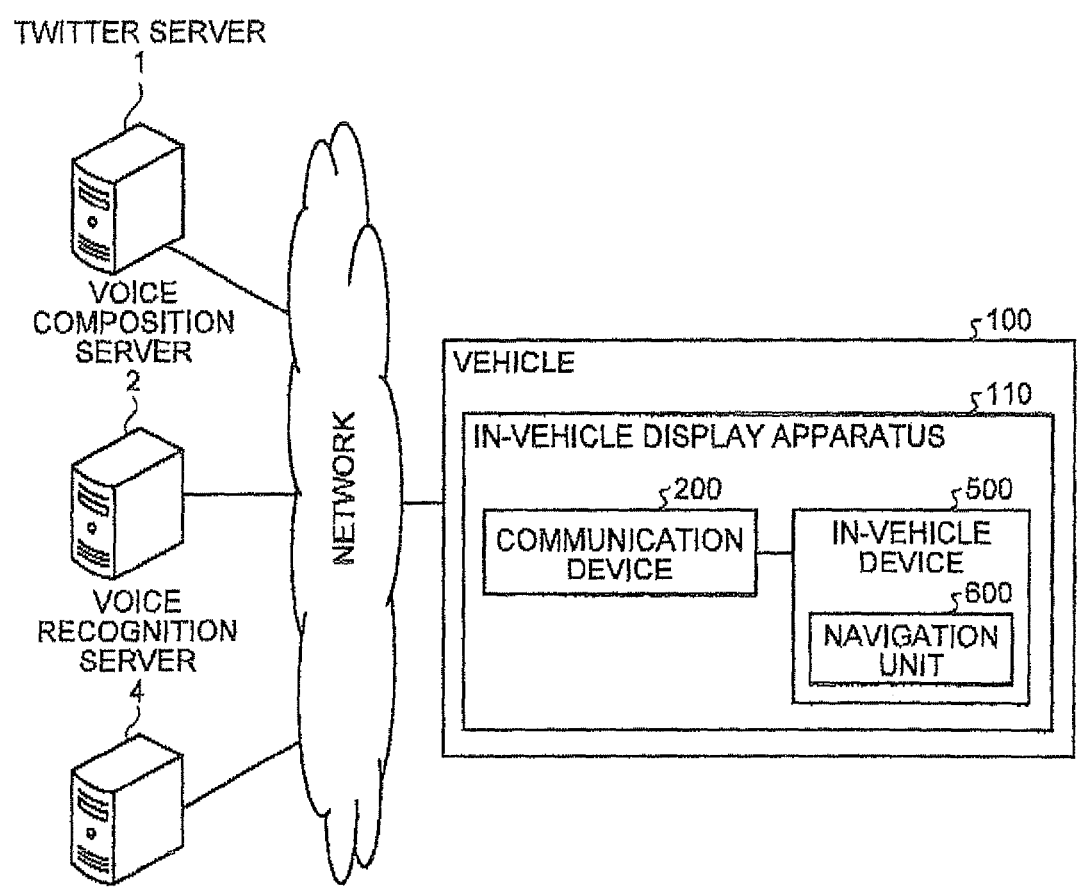
FIG. 22 is a diagram illustrating the overall structure of a system including an in-vehicle display apparatus according to a third embodiment.

FIG. 22 is a diagram illustrating the overall structure of a system including an in-vehicle display apparatus according to the third embodiment. As illustrated in FIG. 22, the system includes a Twitter server 1, a voice composition server 2, a voice recognition server 4, and an in-vehicle display apparatus 110 that is provided in a vehicle 100 such as a car. The Twitter server 1, the voice composition server 2, and the voice recognition server 4 have the same functions as those according to the first embodiment and thus a detailed description thereof will be omitted.

The in-vehicle display apparatus 110 is provided in the vehicle 100 and includes a communication device 200 and an in-vehicle device 500. In the in-vehicle display apparatus 110, the communication device 200 and the in-vehicle device 500 are provided in different housings, but the invention is not limited thereto. For example, the communication device 200 and the in-vehicle device 500 may be provided in a housing.

Similar to the communication device 20 according to the first embodiment, the communication device 200 is, for example, a mobile phone, a personal computer, or a smart phone that can be connected to the Web or the Internet and is connected to the in-vehicle device 500 by, for example, wireless communication or a USB. The communication device 200 outputs, for example, posted information and voice data to the in-vehicle device 50 and performs various kinds of processes according to the content of the operation of the user through, for example, a touch panel of the in-vehicle device 500.

Various kinds of functions of the communication device 200, such as a function of acquiring posted information, an information classification function, a post cooperation function, an information edition function, an operation specifying function and, an information input function, are the same as those of the communication device 20 illustrated in FIG. 2 and thus a detailed description thereof will be omitted. In particular, the communication device 200 differs from the communication device 20 according to the first embodiment in that the map data to which posted information is added is acquired from the in-vehicle device 500, not the map server 3. The communication device 200 may acquire the coordinates of the operation position of the user from the in-vehicle device 500 and specify the content of the operation using the acquired coordinates. The communication device 200 may acquire the latitude and longitude of the operation position of the user from the in-vehicle device 500 and specify the content of the operation using the acquired latitude and longitude.

The communication device 200 may transmit posted information and geographical location data to the in-vehicle device 500, and the in-vehicle device 500 may specify the posted position from the geographical location data and display the posted information on the specified map data.

The in-vehicle device 500 includes a liquid crystal monitor, such as a touch panel or a display, and has basic functions, such as a display function, an audio reproducing function, and a communication function with a portable terminal. The second embodiment differs from the first embodiment in that the in-vehicle device 500 includes a navigation unit 600. That is, the in-vehicle device 500 according to the third embodiment has map data and a route guidance function.

The functions of the in-vehicle device 500, such as a display control function, a command control function, and a voice control function, are the same as those of the in-vehicle device 50 illustrated in FIG. 2 and a detailed description thereof will be omitted. In particular, the navigation unit 600 of the in-vehicle device 500 that is not provided in the in-vehicle device 50 according to the first embodiment has map data stored in a storage medium, such as a Digital Versatile Disc (DVD) or a Hard Disk Drive (HDD). When a destination is input, the navigation unit 600 can display a traveling route, from the current position to the destination on the display panel.

When receiving a user operation input to the display panel, the navigation unit 600 transmits the coordinates or the latitude and longitude indicating the operation position to the communication device 200. In addition, the navigation unit 600 transmits map data in which a desired position is displayed to the communication device 200 in response to a request from the communication device 200 and displays image data received from the communication device 200 on the display panel. When receiving the posted information and the posted position from the communication device 200, the navigation unit 600 may add the posted information to the posted position to generate map data.

When the posted information on the map data displayed on the display panel is selected, the navigation unit 600 may guide a route to the selected posted information as the destination.

The in-vehicle display apparatuses according to the embodiments of the invention have been described above, but the invention is not limited to the above-described embodiments. The invention can be applied to various embodiments. Next, other embodiments will be described.

The fixed phrases described in the first embodiment may be changed depending on, for example, the season, time, weather, and taste of the user. For example, when the season is the "summer," "snow" is not used as the fixed phrase, but "ultraviolet light is strong" may be used as the fixed phrase. In addition, the fixed phrase "traffic jam" may not vary depending on the season, time, weather, and taste of the user, that is, it may be fixed information that cannot be changed by the user.

In the above-described embodiment, when the fixed phrase is posted, the geographical location data, the moving picture data, and the voice data are added, but the invention is not limited thereto. For example, the profile information of the user may be posted as the detailed information of the fixed phrase.

In the above-described embodiments, the communication device 20 generates the map data in which the vehicle is disposed at the center, but the invention is not limited thereto. The vehicle may be disposed at any position on the map data. In this case, for example, a "button" capable of checking the position of the vehicle may be displayed on the map data. When the trend direction is pressed, the communication device 20 may acquire map data in the trend direction from the map server 3 and transmit the map data to the in-vehicle device 50. That is, it is possible to scroll in the trend direction.

For example, in the above-described embodiments, the category "custom" may be used as information shared only between the followers of Twitter (registered trademark), that is, between other users designated by the user. In this case, when a plurality of vehicles is driven, the posted information can be exchanged only between the users who drive the vehicles. In this way, it is possible to prevent the posted information from a designated user being buried with the posted information from other users.

For example, voice recognition may be performed by the operation specifying unit 32 and the information input unit 34 using the microphone 24 of the communication device 20 or the microphone 57 of the in-vehicle device 50. That is, either the communication device 20 or the in-vehicle device 50 may receive voice signals. In this case, as described above, voice recognition is also performed using the voice recognition server 4. In addition, when the communication device 20 or the in-vehicle device 50 has a voice recognition engine (application), the in-vehicle display apparatus 11 may perform voice recognition, without using the voice recognition server 4.

The functional concept of the components of each apparatus is illustrated in the drawings, but the components are not necessarily physically configured as illustrated in the drawings. For example, the detailed example of the distribution and integration of the components is not limited to the above. All or some of the components may be functionally or physically distributed or integrated in any unit according to various kinds of loads or use conditions. All or some of the processing functions of each component may be implemented by a processor, such as a CPU, and programs that are analyzed and executed by the processor, or they may be implemented as hardware by a wired logic.

For example, in the above-described embodiments, the in-vehicle display apparatus 11 includes the communication device 20 and the in-vehicle device 50, but the invention is not limited thereto. For example, the in-vehicle device 50 may have the function of the communication device 20.

The display method according to this embodiment may be implemented by executing a program that is prepared in advance with a computer, such as a personal computer or a workstation. The program may be distributed through a network, such as the Internet. In addition, the program may be recorded on a computer-readable recording medium, such as a hard disk, a flexible disk (FD), a CD-ROM, an MO, or a DVD. Then, the program may be read from the recording medium by the computer and then executed.

In this way, it is possible to know the content of the posted information displayed on the in-vehicle device at a glance without hindering safe driving.

As described above, the in-vehicle display apparatus and the display method according to the embodiment of the invention are useful to display information posted by the user and are particularly suitable to know the content of the posted information displayed on the in-vehicle device at a glance without hindering safe driving.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An in-vehicle display apparatus that is provided in a vehicle, comprising:
    an acquiring unit that acquires a plurality of posted information items which are posted by a plurality of users in real time and to which geographical location data indicating a destination of each of the plurality of posted information items is added;
    a category classifying unit that specifies a posted information item to be displayed from the plurality of posted information items based on a hash tag included in each of the plurality of posted information items, and classifies the specified posted information item into categories, which are not categories by the geographical location data indicating the destination of the posted information item, based on the hash tag; and
    a display unit that displays map data in which the posted information item is displayed, using a display method that is changed based on an elapsed time from the posting of the information to the acquisition of the posted information by the acquiring unit, in a speech-bubble-type icon of a color which is specified according to the category classified by the category classifying unit at a position which is specified on the basis of the geographical location data, when the elapsed time from the posting of the posted information item to the acquisition of the posted information item that is acquired by the acquiring unit is less than a predetermined time.

2. The in-vehicle display apparatus according to claim 1, wherein the display unit displays the map data in a display format including an operation unit that displays details of the posted information item,
    wherein, when receiving an operation input to the operation unit, the display unit displays the details of the posted information item.

3. The in-vehicle display apparatus according to claim 1, wherein a plurality of classified posted information items classified by the category classifying unit, which are displayed so as to be selected by an operation of the display unit, are displayed, and
    wherein, when one of the plurality of classified posted information items displayed on the map data is selected, the display unit displays the plurality of classified posted information items edited in a list format.

4. The in-vehicle display apparatus according to claim 3, wherein the display unit displays the plurality of classified posted information items that are edited in a list format in which the plurality of classified posted information items are arranged in time series on the basis of a post time, a list format in which the plurality of classified posted information items are arranged in ascending order of a distance from a position on the map data where an operation input is received, or a list format in which the plurality of classified posted information items are arranged in the categories classified by the category classifying unit.

5. The in-vehicle display apparatus according to claim 1, wherein the display unit displays fixed phrases related to the posted information item so as to be selectable and displays a selected fixed phrase at a current position of the vehicle on the map data.

6. The in-vehicle display apparatus according to claim 5, wherein the fixed phrases are prepared for each of the categories classified by the category classifying unit.

7. The in-vehicle display apparatus according to claim 6, wherein the fixed phrases include a fixed phrase that varies depending on at least one of a season, time, weather, and taste of a user and a fixed phrase that does not vary depending on the season, time, weather, and taste of the user in each of the categories classified by the category classifying unit.

8. The in-vehicle display apparatus according to claim 1, wherein the display unit displays the map data in which directional information indicating a direction of a position where a posted information item related to predetermined taste information is displayed or a position where the number of posted information items is larger than that of previously displayed posted information items by a predetermined value is displayed.

9. A display method that displays information on an in-vehicle display apparatus, comprising:
    acquiring a plurality of posted information items which are posted by a plurality of users in real time and to which geographical location data indicating a destination of each of the plurality of posted information items is added;
    specifying a posted information item to be displayed from the plurality of posted information items based on a hash tag included in each of the plurality of posted information items;
    classifying the specified posted information item into categories, which are not categories by the geographical location data indicating the destination of the posted information item, based on the hash tag; and
    displaying map data in which the classified specified posted information item is displayed, using a display method that is changed based on an elapsed time from the posting of the classified specified posted information item to the acquisition of the specified posted information, in a speech-bubble-type icon of a color which is specified according to a classified category at a position specified by the geographical location data which is acquired together with the classified posted information item, when the elapsed time from the posting of the classified specified posted information item to the acquisition of the classified specified posted information item that is acquired is less than a predetermined time.

10. An information display system comprising:

a communication apparatus that acquires a plurality of posted information items; and a display apparatus that displays a the plurality of posted information items, wherein the communication apparatus includes:

an information acquiring unit that acquires the plurality of posted information items which are posted by a plurality of users in real time and to which geographical location data indicating a destination of each of the plurality of posted information items is added; and a category classifying unit that specifies a posted information item to be displayed from the acquired plurality of posted information items based on a hash tag included in each of the plurality of posted information items, and classifies the specified posted information item into categories, which are not categories by the geographical location data indicating the destination of the posted information item, based on the hash tag; and the display apparatus includes an information display unit that displays map data in which the classified posted information item is displayed, using a display method that is changed based on an elapsed time from the posting of the classified posted information item to the acquisition of the classified posted information item by the information acquiring unit, in a speech-bubble-type icon of a color which is specified according to the category classified by the category classifying unit at a position specified by the geographical location data that is acquired together with the classified posted information item by the information acquiring unit, when the elapsed time from the posting of the classified posted information item to the acquisition of the classified posted information item that is acquired by the information acquiring unit is less than a predetermined time.

* * * * *